US010338389B2

(12) United States Patent
Han

(10) Patent No.: US 10,338,389 B2
(45) Date of Patent: Jul. 2, 2019

(54) HEAD MOUNTED DISPLAY DEVICE FOR DISPLAYING IMAGE AND METHOD THEREOF

(71) Applicant: Samsung Electronics Co., Ltd., Gyeonggi-do (KR)

(72) Inventor: Soon-seob Han, Seoul (KR)

(73) Assignee: Samsung Electronics Co., Ltd. (KR)

( * ) Notice: Subject to any disclaimer, the term of this patent is extended or adjusted under 35 U.S.C. 154(b) by 336 days.

(21) Appl. No.: 14/806,167

(22) Filed: Jul. 22, 2015

(65) Prior Publication Data

US 2016/0033772 A1    Feb. 4, 2016

(30) Foreign Application Priority Data

Jul. 29, 2014  (KR) .................. 10-2014-0096765
Jan. 15, 2015  (KR) .................. 10-2015-0007447

(51) Int. Cl.
*H04N 1/60* (2006.01)
*G02B 27/01* (2006.01)

(52) U.S. Cl.
CPC ....... *G02B 27/0172* (2013.01); *H04N 1/6083* (2013.01); *G02B 2027/0112* (2013.01); *G02B 2027/0178* (2013.01)

(58) Field of Classification Search
CPC ............ G02B 27/0101; G02B 27/0172; G02B 27/017; G02B 2027/0178; G02B 2027/0118; G02B 2027/014
USPC ......................................................... 359/630
See application file for complete search history.

(56) References Cited

U.S. PATENT DOCUMENTS

| 6,863,395 B1* | 3/2005 | Teng .................. G02C 1/02 351/103 |
| 9,280,005 B2 | 3/2016 | Spitzer et al. |
| 2010/0321409 A1 | 12/2010 | Komori et al. |
| 2013/0016292 A1 | 1/2013 | Miao et al. |

(Continued)

FOREIGN PATENT DOCUMENTS

| CN | 102809821 | 12/2012 |
| CN | 103901618 | 7/2014 |

(Continued)

OTHER PUBLICATIONS

Taiwanese Office Action dated Jun. 3, 2016 issued in counterpart application No. 104122235, 10 pages.

(Continued)

*Primary Examiner* — Evan P Dzierzynski
*Assistant Examiner* — Mitchell T Oestreich
(74) *Attorney, Agent, or Firm* — The Farrell Law Firm, P.C.

(57) ABSTRACT

A head mounted display (HMD) device, a method by the HMD of displaying an image, a non-transitory computer readable recording medium, and a chipset are provided. The HMD device includes a color information obtaining unit configured to obtain color information regarding a lens arranged at a portion of the HMD device; and a control unit configured to output an image modified based on the color information via a display unit arranged at the HMD device. The method includes obtaining color information regarding a lens arranged at a portion of the HMD device; and outputting an image modified based on the color information via a display unit arranged at the HMD device.

18 Claims, 37 Drawing Sheets

(56) References Cited

U.S. PATENT DOCUMENTS

| | | | |
|---|---|---|---|
| 2013/0021373 A1* | 1/2013 | Vaught | G02B 27/017 |
| | | | 345/633 |
| 2013/0113973 A1 | 5/2013 | Miao | |
| 2013/0169682 A1 | 7/2013 | Novak et al. | |
| 2014/0063055 A1 | 3/2014 | Osterhout et al. | |
| 2016/0018658 A1 | 1/2016 | Machida et al. | |

FOREIGN PATENT DOCUMENTS

| | | |
|---|---|---|
| GB | 2516758 | 2/2015 |
| JP | 2009-092810 | 4/2009 |
| JP | 2010-206673 | 9/2010 |
| KR | 10-2012-0036242 | 4/2012 |
| KR | 1020140090968 | 7/2014 |
| TW | M 343803 | 11/2008 |
| TW | 201418775 | 5/2014 |
| WO | WO 2014/138751 | 9/2014 |

OTHER PUBLICATIONS

European Search Report dated Jan. 7, 2016 issued in counterpart application No. 15177660.6-1902, 7 pages.
International Search Report dated Oct. 19, 2015 issued in counterpart application No. PCT/KR2015/007391, 3 pages.
Taiwanese Office Action dated Jan. 4, 2017 issued in counterpart application No. 10620005600, 12 pages.
Chinese Office Action dated Apr. 1, 2017 issued in counterpart application No. 201510456850.7, 14 pages.
Chinese Office Action dated Dec. 5, 2017 issued in counterpart application No. 201510456850.7, 18 pages.
Chinese Office Action dated May 9, 2018 issued in counterpart application No. 201510456850.7, 16 pages.
Indian Examination Report dated Feb. 4, 2019 issued in counterpart application No. 2686/MUM/2015, 5 pages.

* cited by examiner

FIG. 33

| CODE | R | G | B | NAME | | NAME | R | G | B | CODE |
|---|---|---|---|---|---|---|---|---|---|---|
| FF0000 | 255 | 0 | 0 | RED | – | BLUISH GREEN | 0 | 102 | 102 | 006600 |
| FC4700 | 255 | 71 | 0 | SCARLET | – | OCEAN BLUE | 0 | 145 | 151 | 009297 |
| FC6600 | 255 | 102 | 0 | ORANGE | – | BLUE | 5 | 17 | 242 | 0611F2 |
| FFFF00 | 255 | 255 | 0 | YELLOW | – | NAVY | 0 | 0 | 126 | 00007E |
| 7DCD00 | 125 | 205 | 0 | YELLOW GREEN | – | VIOLET | 128 | 0 | 127 | 90007F |
| 009900 | 0 | 153 | 0 | GREEN | – | PURPLE | 232 | 0 | 115 | E90074 |

FIG. 45
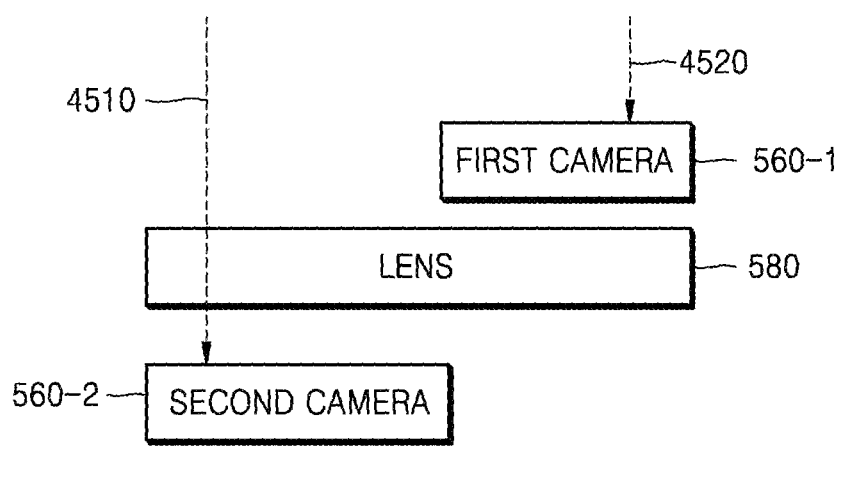
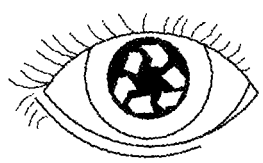

HEAD MOUNTED DISPLAY DEVICE FOR DISPLAYING IMAGE AND METHOD THEREOF

PRIORITY

This application claims priority under 35 U.S.C. § 119(a) to a Korean Patent Application filed on Jul. 29, 2014 in the Korean Intellectual Property Office and assigned Serial No. 10-2014-0096765 and to a Korean Patent Application filed on Jan. 15, 2015 in the Korean Intellectual Property Office and assigned Serial No. 10-2015-0007447, the entire contents of both of which are incorporated herein by reference.

BACKGROUND

1. Field of the Invention

The present invention relates generally to a wearable display device, and more particularly, to a Head Mounted Display (HMD) device.

2. Description of the Related Art

Along with reductions in weights and sizes of digital devices, various wearable devices have been developed. From among the wearable devices, Head Mounted Display (HMD) devices refer to various digital devices that are worn by a user on the head and provide multimedia content to the user. An HMD device may be embodied in any of various forms e.g., glasses, a helmet, etc., to be worn on the head.

Since an HMD device is used after being attached to the body of a user, the HMD device provides images to the user from various environments as the user moves. Therefore, it is necessary that the HMD device include lenses with various colors or transmissivity. For example, the HMD device may include a dark-colored lens to block sunlight at an outdoor location where the sun is strong or a transparent-colored lens used at an indoor location. Thus, the user may properly see his/her surroundings.

The HMD device may switch a lens arranged at a side thereof to a lens having another color. Alternatively, if a lens arranged at a side of an HMD device is a smart window capable of changing at least one of color and transmissivity thereof, the HMD device may control the color and transmissivity of the lens. As the color or transmissivity of a lens arranged at a side of an HMD device is modified, the HMD device may provide an image that may be more easily recognized by the user.

SUMMARY

The present invention has been made to address the above-mentioned problems and disadvantages, and to provide at least the advantages described below.

Accordingly, an aspect of the present invention provides an HMD device capable of providing content via user interfaces that may be more clearly recognized by a user and a method of displaying content via the HMD device.

Additional aspects will be set forth in part in the description which follows and, in part, will be apparent from the description, or may be learned by practice of the presented invention.

In accordance with an aspect of the present invention, an HMD is provided. The HMD includes a color information obtaining unit configured to obtain color information regarding a lens arranged at a portion of the HMD device; and a control unit configured to output an image modified based on the color information via a display unit arranged at the HMD device.

In accordance with another aspect of the present invention, a method by an HMD device of displaying an image is provided. The method includes obtaining color information regarding a lens arranged at a portion of the HMD device; and outputting an image modified based on the color information via a display unit arranged at the HMD device.

In accordance with another aspect of the present invention, a non-transitory computer readable recording medium having recorded thereon a computer program for implementing a method by an HMD device of displaying an image is provided. The method includes obtaining color information regarding a lens arranged at a portion of the HMD device; and outputting an image modified based on the color information via a display unit arranged at the HMD device.

In accordance with another aspect of the present invention, a chipset for displaying an image is provided. The chipset is configured to obtain color information regarding a lens arranged at a portion of an HMD device, and output an image modified based on the color information via a display unit arranged at the HMD device.

BRIEF DESCRIPTION OF THE DRAWINGS

The foregoing and other aspects, features, and advantages of the present invention will be more apparent from the following description, taken in conjunction with the accompanying drawings, in which:

FIG. 33 is a chart of complementary colors that may be used to modify an image according to an embodiment of the present invention;

FIG. 45 is a diagram of a method of an HMD device picking up an image for controlling a color or transmissivity according to an embodiment of the present invention.

DETAILED DESCRIPTION OF EMBODIMENTS OF THE PRESENT INVENTION

Figure 1:
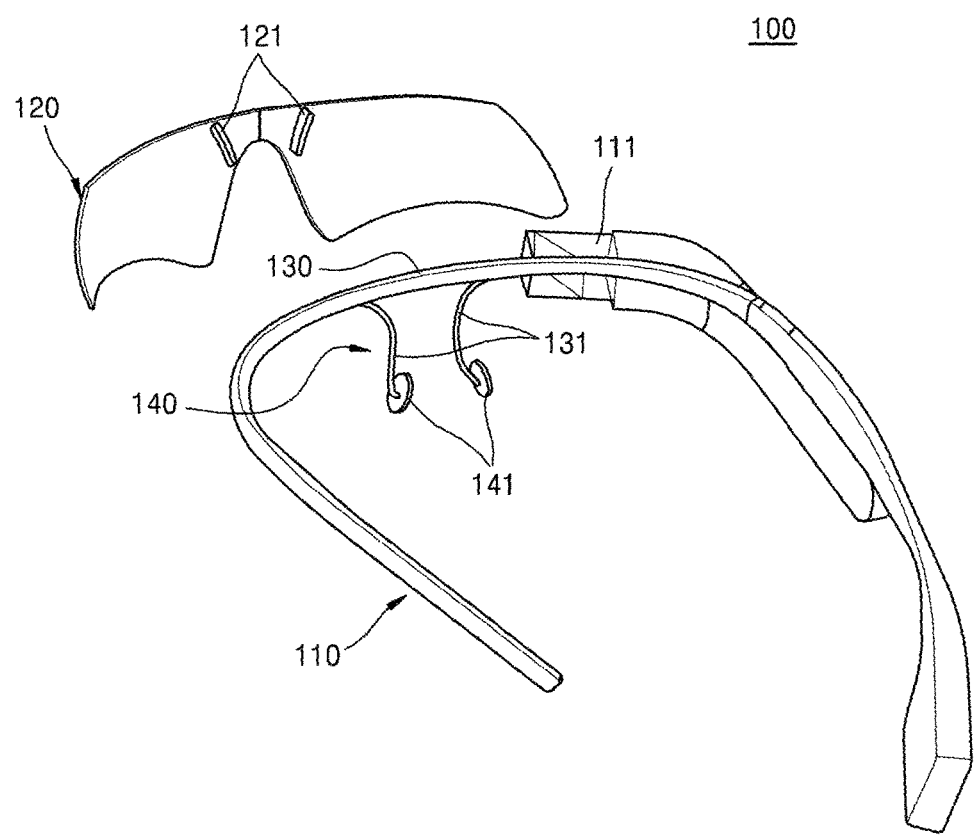
FIG. 1 illustrates a Head Mounted Display (HMD) device according to an embodiment of the present invention.

Reference will now be made in detail to embodiments of the present invention, examples of which are illustrated in the accompanying drawings, wherein like reference numerals refer to like elements throughout. In this regard, the embodiments of the present invention may have different forms and should not be construed as being limited to the descriptions set forth herein. Accordingly, the embodiments of the present invention are merely described below, by referring to the accompanying drawings, to explain aspects of the present invention. As used herein, the term "and/or" includes any and all combinations of one or more of the associated listed items. Expressions such as "at least one of," when preceding a list of elements, modify the entire list of elements and do not modify the individual elements of the list.

Throughout the present disclosure, it will be understood that when a portion is referred to as being "connected to" another portion, it can be "directly connected to" the other portion or "electrically connected to" the other portion via another element. Furthermore, it will be further understood that the terms "comprises" and/or "comprising" used herein specify the presence of stated features or components, but do not preclude the presence or addition of one or more other features or components.

Throughout the present disclosure, "lens" may refer to an object capable of transmitting light therethrough. A lens is not limited to an object with surfaces for forming an optical image. For example, a lens may be an object with flat surfaces. A lens may be formed of glass, crystal, or plastic. Alternatively, a lens may be a smart window. A smart window may include an element of which at least one of color or transmissivity can be changed based on a signal applied thereto. For example, an electrochromic glass, a Suspended Particle Device (SPD), or a Liquid Crystal (LC) may be used to form a smart window.

Throughout the present disclosure, an image displayed by an HMD device includes not only an image displayed directly on a lens, but also an image recognized by a user like as being displayed on a lens.

Furthermore, throughout the present disclosure, "displaying an image on a lens" includes not only a case where an image is displayed directly on a lens, but also a case where an image is output to be recognized by a user like as being displayed on a lens.

FIG. 1 illustrates an HMD device 100 according to an embodiment of the present invention.

Referring to FIG. 1, the HMD device 100 may be embodied in the form of eyeglasses that may be fixed to the face of a user (or a wearer) via the ears and the nose of the user. However, a configuration of the HMD device 100 is not limited thereto. For example, the HMD device 100 may be attached to a helmet or may be embodied in the form of goggles.

The HMD device 100 according to an embodiment of the present invention may include a frame 110. The HMD device 100 according to an embodiment of the present invention may include a nosepiece 140 to be fixed on the nose of a user at the center portion 130. According to an embodiment of the present invention, the nosepiece 140 may include bridge arms 131 and pads 141.

According to an embodiment of the present invention, a detachable lens 120 may be attached to the frame 110. A plurality of lenses 120 of different colors may be used. For example, the user may use the HMD device 100 having attached thereto a clear lens 120 indoors and may use the HMD device 100 having attached thereto a lens 120 with a dark color outdoors. For example, clips 121 arranged at the lens 120 may be attached to the bridge arms 131 of the HMD device 100.

Furthermore, the HMD device 100 may include a display unit 111 for displaying images. The display unit 111 may be embodied in various forms according to an embodiment of the present invention. For example, the display unit 111 may be configured to form images on the retina of a user or may be configured to display images on a lens as shown in FIG. 1.

Figure 2:
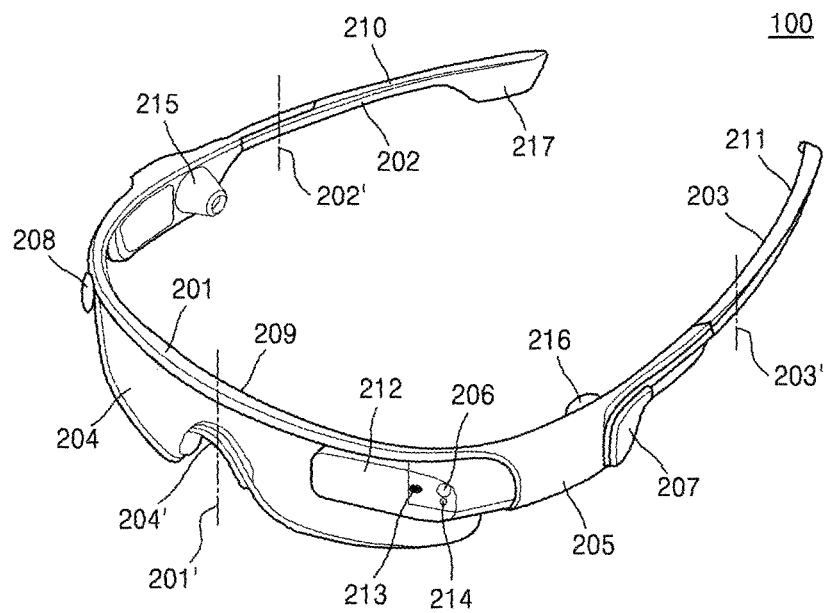
FIG. 2 illustrates an HMD device according to an embodiment of the present invention.

FIG. 2 illustrates an HMD device 100 according to an embodiment of the present invention.

Referring to FIG. 2, the HMD device 100 may be embodied in the form of eyeglasses that may be fixed to the face of a user (or a wearer) via the ears and the nose of the user. However, the configuration of the HMD device 100 is not limited thereto. For example, the HMD device 100 may be attached to a helmet or may be embodied in the form of goggles.

The HMD device 100 shown in FIG. 2 may include a lens frame 201, right and left side-arms 202 and 203, a lens 204, an on-board computer 205, a camera 206, a user input unit 207, sensors 208, 209, and 210, a haptic module 211, a display 212, an optical output unit 213, a microphone 214, right and left speakers 215 and 216, and a power supply unit 217.

Some of the components included in the HMD device 100 may be arranged internally to the HMD device 100, whereas the remaining components may be arranged externally to the HMD device 100. For example, the sensors 208, 209, and 210 may be arranged internally to the HMD device 100. The display 212 may be arranged externally to the HMD device 100. Components arranged internally to the HMD device 100 and components arranged externally to the HMD device 100 are not limited thereto.

Components included in the HMD device 100 are not limited to those shown in FIG. 2. For example, the HMD device 100 may exclude some of the sensors 208, 209, and 210 and the haptic module 211. For example, the HMD device 100 may include only the sensor 210 from among the sensors 208, 209, and 210 or may include more sensors at more locations internally or externally to the HMD device 100 than those shown in FIG. 2.

The lens frame 201 and the right and left side-arms 202 and 203 may be formed of a solid material, such as a plastic and/or a metal, and may have a hollow structure to include wiring for interconnecting components included in the HMD device 100.

The lens frame 201 and the right and left side-arms 202 and 203 shown in FIG. 2 may be integrated with each other without a connecting member. Therefore, the lens frame 201 and the right and left side-arms 202 and 203 may be referred to collectively as a frame of the HMD device 100.

The structure of the lens frame 201 and the right and left side-arms 202 and 203 are not limited to that shown in FIG. 2. For example, the HMD device 100 may be configured to have a structure in which connecting members are arranged between the lens frame 201 and the right and left side-arms 202 and 203. In other words, if the HMD device 100 is configured to have a structure in which a connecting member is arranged between the lens frame 201 and the right side-arm 202 and a connecting member is arranged between the lens frame 201 and the left side-arm 203, the right and left side-arms 202 and 203 may be folded toward the lens frame 201.

If the HMD device 100 is configured to have a structure in which a connecting member is arranged at the center 201' of the lens frame 201, a connecting member is arranged between the lens frame 201 and the right side-arm 202, a connecting member is arranged between the lens frame 201 and the left side-arm 203, and connecting members are arranged at the respective centers 202' and 203' of the right and left side-arms 202 and 203, the lens frame 201 and the right and left side-arms 202 and 203 may be folded inward via the respective connecting members, thereby reducing volume of the HMD device 100.

The connecting members may be screw-assembled or may be attached via hooks and grooves. However, the present invention is not limited thereto.

The right and left side-arms 202 and 203 may be formed to have shapes to be hung on the ears of a user. The right and left side-arms 202 and 203 may be configured to extend to the back of the head of the user. If the right and left side-arms 202 and 203 are configured to extend to the back of the head of the user, a band for fixing the right and left side-arms 202 and 203 to the head of the user may be added to the right and left side-arms 202 and 203. The band may be an elastic band for fixing the right and left side-arms 202 and 203 to the head of the user regardless of the size of the head of the user.

Anti-slip members may be attached to inner portions of the right and left side-arms 202 and 203 contacting portions of the head of the user behind the earflaps to prevent the right and left side-arms 202 and 203 from slipping.

Figure 4:
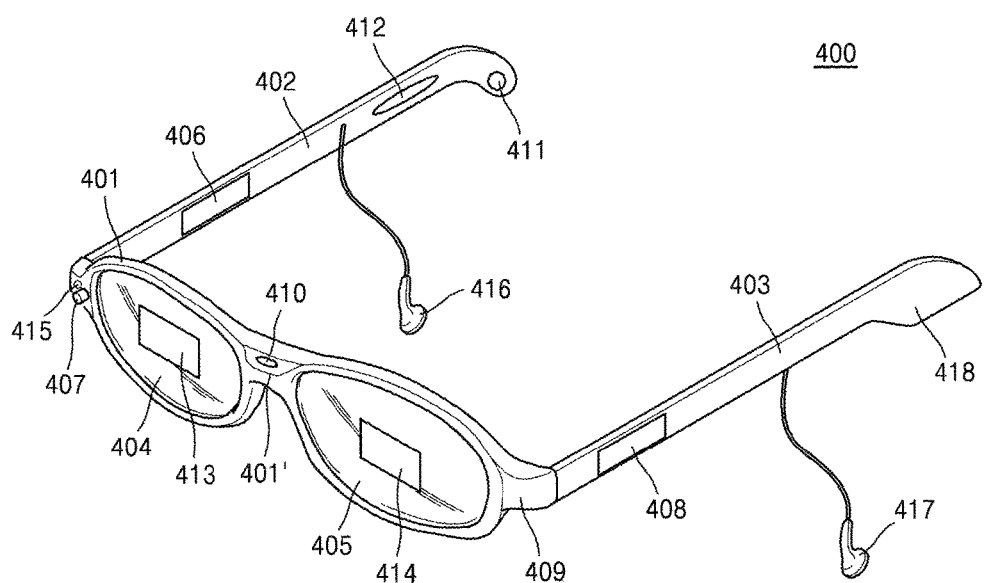
FIG. 4 illustrates an HMD device according to an embodiment of the present invention.

The lens frame 201 may be configured such that the lens 204 is attached thereto and detached therefrom. The lens 204 shown in FIG. 2 is integrated with a nosepiece 204'. However, the present invention is not limited thereto. For example, if the lens frame 201 is integrated with a nosepiece 204', the lens 204 may include a right lens 404 and a left lens 405 as shown in FIG. 4.

The lens 204 may be formed of a transparent material that allows a user to see therethrough. The lens 204 may be formed of a material that transmits a light reflected by the display 212. Materials for forming the lens 204 may include a plastic, such as a polycarbonate, and a glass, but is not limited thereto. The lens 204 may include at least one of an anti-reflection and anti-glare coating, an anti-fog coating, and an UltraViolet (UV) ray block coating.

The on-board computer 205 may be connected to the HMD device 100 by a wire or wirelessly. The on-board computer 205 is located at a portion of the left side-arm 203 near the lens frame 201. However, the present invention is not limited thereto. For example, the on-board computer 205 may be arranged at another portion of the HMD device 100, e.g., a portion of the right side-arm 202, another portion of the left side-arm 203, etc.

The on-board computer 205 may receive data from the camera 206, the user input unit 207, and the sensors 208, 209, and 210, analyze the received data, and generate data to be provided to a user of the HMD device 100 via at least one of the optical output unit 213, the display 212, and the right and left speakers 215 and 216. Data to be provided to a user may include at least one of an image, text, video, and audio. However, the present invention is not limited thereto.

The camera 206 may be arranged at an outer portion of the left side-arm 203 or may be arranged internally to the left side-arm 203. The camera 206 may be attached to other locations of the HMD device 100. For example, the camera 206 may be arranged at a portion of the right side-arm 202 or at a portion (e.g., the center) of the lens frame 201. The camera 206 may be a small-sized camera for a smart phone or a webcam. The camera 206 may be arranged at a location for photographing at least a portion of the surroundings of the user of the HMD device 100.

The user input unit 207 may include at least one of a touch pad that may be operated by fingers of a user and a button that may be push-operated by a user. However, the present invention is not limited thereto. The user input unit 207 may be arranged at a location of the left side-arm 203 or other locations of the HMD device 100. For example, the user input unit 207 may be arranged at another portion of the left side-arm 203, a portion of the right side-arm 202, or a portion of the lens frame 201.

The user input unit 207 may be used by a user to input a command. The user input unit 207 may include an "ON/OFF" switch for turning on/off the HMD device 100.

The sensor 208 may be a biological information detecting sensor for detecting biological information of a user. The sensor 208 is arranged to protrude from a lower-right portion of the lens frame 201. However, attachment of the sensor 208 is not limited thereto. For example, the sensor 208 may be arranged internally to the lens frame 201 or may be arranged on the lens frame 201. The sensor 208 may be arranged at an arbitrary portion of the HMD device 100.

If the sensor 208 consists of an image sensor based camera, the sensor 208 may detect a bloodshot eye, eye dryness, eye blinking rate, pupil locations, and a change of the pupils of the eyes of the user. However, the present invention is not limited thereto.

If the sensor 208 is at least one of an oxygen sensor, an air sensor, and a fine dust sensor, the sensor 208 may detect eye dryness of the user. However, the present invention is not limited thereto.

The sensor 209 may be a surrounding environment sensor for detecting the surrounding environment of the HMD device 100. The sensor 209 is arranged at the inner center portion of the lens frame 201. However, the present invention is not limited thereto. For example, the sensor 209 may be arranged at at least one of an inner portion of the lens frame 201 other than the inner center portion of the lens frame 201, an outer portion of the lens frame 201, an inner portion of the right and left side-arms 202 and 203, and an outer portion of the right and left side-arms 202 and 203. However, locations and structures for attaching the sensor 209 are not limited thereto. The sensor 209 may be a sensor for detecting environmental conditions, such as temperature, light condition, humidity, wind speed, altitude, and atmospheric pressure in the vicinity of the HMD device 100. However, the detectable environmental conditions are not limited thereto.

If the sensor 208 is configured as at least one of an oxygen sensor, an air sensor, and a fine dust sensor as described above, information regarding the surrounding environment of the HMD device 100 may be based on signals detected by the sensor 208. In this case, the HMD device 100 may exclude the sensor 209.

The sensor 210 may be a sensor for detecting a state of wearing the HMD device 100. The sensor 210 is arranged at an inner portion of the right side-arm 202 that contacts a surface of the head of a user behind the ear. However, a location of the sensor 210 is not limited thereto. For example, the sensor 210 may be arranged at an inner portion of the left side-arm 203 that contacts a surface of the head of a user behind the ear or inside the power supply unit 217 that contacts a surface of the head of a user behind the ear.

The sensor 210 may be a pressure sensor. In this case, the sensor 210 may detect a pressure and magnitude thereof and transmit signals regarding the pressure to the on-board computer 205. Therefore, based on detected values received from the sensor 210, the on-board computer 205 may detect a period of time when a user wears the HMD device 100 or a period of time when the user executed applications while wearing the HMD device 100.

The haptic module 211 is arranged at an inner portion in the vicinity of the end of the left side-arm 203 of the HMD device 100. However, the location of the haptic module 211 is not limited thereto. For example, the haptic module 211 may be arranged at an inner portion of the right side-arm 202 or at another location of the HMD device 100.

The haptic module 211 may be formed of a material capable of generating various tactile sensations that may be felt by a user. For example, the haptic module 211 may be formed of a material capable of generating various tactile sensations, such as a material capable of generating a vibration, a stimulation of contacting a skin surface, a stimulation based on jetting or sucking air, a stimulation based on contact of electrodes, a stimulation using electrostatic force, cool/warm sensations based on a heat-absorbing device or a heat-emitting device, etc. However, the present invention is not limited thereto.

The display 212 is connected to the left side-arm 203 of the HMD device 100 and located at the upper-left portion of the lens 204. However, the location of the display 212 is not limited thereto. For example, the display 212 may be connected to the right side-arm 202 to be located at the right center of the lens 204 or may be connected to the left side-arm 203 to be located at the left center of the lens 204. The display 212 may be formed of a semi-transparent optical waveguide (e.g., a prism). However, the inventive concept is not limited thereto. Therefore, the display 212 may reflect light output by the optical output unit 213 and focus an image at the fovea of the retina of an eye of a user of the HMD device 100.

The optical output unit 213 may be configured as a mini-projector. However, the present invention is not limited thereto.

The microphone 214 may receive a voice signal of a user of the HMD device 100 and other sounds. The microphone 214 may be configured to be selectively set to a close-distance mode or a far-distance mode. For example, if the microphone 214 is set to the close-distance mode, the microphone 214 may be used to receive sounds regarding biological information (e.g., information regarding the blinking of eyes) of a user of the HMD device 100. If the microphone 214 is set to the far-distance mode, the microphone 214 may be used to receive the voice of a user of the HMD device 100. The close-distance mode of the microphone 214 may be a mode for receiving sounds generated internally to the HMD device 100, whereas the far-distance mode of the microphone 214 may be a mode for receiving sounds generated externally to the HMD device 100. However, operation ranges of the close-distance mode and the far-distance mode may be set differently.

The right and left speakers 215 and 216 may be configured as earphones to be mounted on the ears of a user of the HMD device 100. The speaker 215 is located at an inner portion of the right side-arm 202 to be mounted on the right ear of the user. The left speaker 216 is located at an inner portion of the left side-arm 203 to be mounted on the left ear of the user.

The right and left speakers 215 and 216 may be fixed to the HMD device 100 as shown in FIG. 2. However, attachment of the right and left speakers 215 and 216 is not limited thereto. For example, the right and left speakers 215 and 216 may be detachably attached to the HMD device 100, and thus a user of the HMD device 100 may selectively insert the right and left speakers 215 and 216 into the ears of the user.

If the right and left speakers 215 and 216 are detachable from the HMD device 100, the right and left speakers 215 and 216 may be arranged at inner portions of the right and left side-arms 202 and 203 that contact portions of the head of the user behind the ears. Therefore, the user may detach the right and left speakers 215 and 216 from the respective right and left side-arms 202 and 203 and insert the right and left speakers 215 and 216 into the right and left ears, respectively, of the user. In the case of detaching the right and left speakers 215 and 216 from the respective right and left side-arms 202 and 203 and inserting the right and left speakers 215 and 216 into the right and left ears, respectively, of a user as described above, connecting wires may be arranged between the right and left speakers 215 and 216 and the HMD device 100.

Connecting wires between the right and left speakers 215 and 216 and the HMD device 100 may be arranged in the HMD device 100 when the right and left speakers 215 and 216 are attached to the HMD device 100. However, the present invention is not limited thereto. The right and left speakers 215 and 216 and the HMD device 100 may be wirelessly connected to each other based on a close-distance communication.

Connecting members based on elastic members (e.g., springs) may be arranged between the right and left speakers 215 and 216 and the HMD device 100. In this case, the connecting members based on elastic members may be deformed based on locations of the ears of a user. For example, the connecting members may be deformed to be able to tilt the right and left speakers 215 and 216 in at least one of a leftward direction, a rightward direction, an upward direction, and a downward direction. If there are connecting members based on elastic members between the right and left speakers 215 and 216 and the HMD device 100, the right and left speakers 215 and 216 and the HMD device 100 may be configured to communication with each other over wires or wirelessly. According to an embodiment of the present invention, the right and left speakers 215 and 216 may be configured as bone conduction speakers.

The power supply unit 217 is arranged at an end portion of the right side-arm 202 of the HMD device 100. However, the location of the power supply unit 217 is not limited thereto. For example, the power supply unit 217 may be arranged at an end portion of the left side-arm 203 of the HMD device 100.

The power supply unit 217 may be detachably attached to the right side-arm 202 of the HMD device 100. The power supply unit 217 may include an external power connector that may be connected to an external power supply device to charge the HMD device 100 after being connected to the right side-arm 202 or detached from the right side-arm 202. The power supply unit 217 may be integrated with the right side-arm 202 of the HMD device 100. Even when the power supply unit 217 is integrated with the right side-arm 202 of the HMD device 100, the power supply unit 217 may include an external power connector that may be connected to an external power supply device to charge the HMD device 100.

Figure 3:
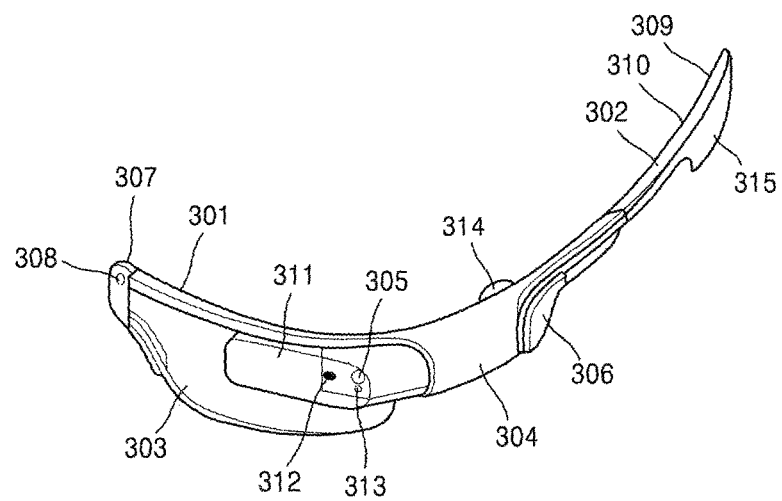
FIG. 3 illustrates an HMD device according to an embodiment Of the present invention.

FIG. 3 illustrates an HMD device 300 according to an embodiment of the present invention. The HMD device 300 shown in FIG. 3 includes a mono-eye lens 303 that may be embodied via a glasses-type display device as shown in FIG. 2 or as a mono-eye display device.

Referring to FIG. 3, the HMD device 300 according to an embodiment of the present invention is a monocle-like device that is fixed to the face of a user via one of the ears and one side of the nose of the user. The HMD device 300 may be attached to a helmet structure.

The HMD device 300 may include a lens frame 301, a side-arm 302, a mono-eye lens 303, an on-board computer 304, a camera 305, a user input unit 306, sensors 307, 308, and 309, a haptic module 310, a display 311, an optical output unit 312, a microphone 313, a speaker 314, and a power supply unit 315.

Components included in the HMD device 300 are not limited to those shown in FIG. 3. For example, the HMD device 300 may exclude some of the sensors 307, 308, and 309 and the haptic module 310. For example, the HMD device 300 may include only the sensor 309 from among the sensors 307, 308, and 309 or may include more sensors at locations internally or externally to the HMD device 300 than those shown in FIG. 3. Locations of the sensors 307, 308, and 309 attached to the HMD device 300 may vary.

The lens frame 301 may be configured to be able to attach and detach from the HMD device 300 as described above with reference to FIG. 1. Furthermore, as described above with reference to FIG. 2, the HMD device 300 may include a connecting member between the lens frame 301 and the side-arm 302. Furthermore, as described above with reference to FIG. 2, the HMD device 300 may include a connecting member at the center of the side-arm 302.

The mono-eye lens 303, the on-board computer 304, the camera 305, the user input unit 306, the sensors 307, 308, and 309, the haptic module 310, the display 311, the optical output unit 312, the microphone 313, the speaker 314, and the power supply unit 315 included in the HMD device 300 may be located and configured similarly as the lens 204, the on-board computer 205, the camera 206, the user input unit 207, the sensors 208, 209, and 210, the haptic module 211, the display 212, the optical output unit 213, the microphone 214, the speaker 216, and the power supply unit 217 (when located in the left side-arm 203) shown in FIG. 2.

The HMD device 100 according to an embodiment of the present invention may be configured like an HMD device 400 shown in FIG. 4. The HMD device 400 shown in FIG. 4 is configured as a binocular display device. The HMD device 400 may be attached to a helmet structure or may have a glasses-like structure.

FIG. 4 illustrates an HMD device 400 according to an embodiment of the present invention.

Referring to FIG. 4, the HMD device 400 may include a lens frame 401, right and left side-arms 402 and 403, right and left lenses 404 and 405, an on-board computer 406, a camera 407, a user input unit 408, sensors 409, 410, and 411, a haptic module 412, right and left displays 413 and 414, a microphone 415, right and left speakers 416 and 417, and a power supply unit 418.

The lens frame 401 included in the HMD device 400 shown in FIG. 4 is integrated with a nosepiece 401'. The lens frame 401 may have any of various shapes including rectangular shape, elliptical shape, and elliptical shape. However, the shape of the lens frame 401 is not limited thereto. The lens frame 401 may be formed of a material similar to that constituting the lens frame 201 as shown in FIG. 2.

The right and left lenses 404 and 405 may comprise an arbitrary material suitable for displaying data including images or graphics projected by an optical output unit, which is a projector as stated above with reference to FIG. 2. The right and left lenses 404 and 405 may comprise a material capable of overlapping data including images or graphics projected by an optical output unit according to the surroundings that a user may see through the right and left lenses 404 and 405. The right and left lenses 404 and 405 may be formed of a plastic material or a glass like the lens 204 described above with reference to FIG. 2. However, materials for forming the right and left lenses 404 and 405 are not limited thereto.

Although some of the right and left side-arms 402 and 403, the on-board computer 406, the camera 407, the user input unit 408, the sensors 409, 410, and 411, the haptic module 412, the microphone 415, the right and left speakers 416 and 417, and the power supply unit 418 shown in FIG. 4 are arranged at different locations from the right and left side-arms 202 and 203, the on-board computer 205, the camera 206, the user input unit 207, the sensors 208, 209, and 210, the haptic module 211, the microphone 214, the right and left speakers 215 and 216, and the power supply unit 217 shown in FIG. 2, functions and configurations of the above-stated components of FIG. 4 may be similar to those of the components shown in FIG. 4. However, the present invention is not limited thereto.

The right and left displays 413 and 414 shown In FIG. 4 may display data including images or graphics projected by the optical output units that may be attached to the inner surfaces of the respective right and left side-arms 402 and 403.

The HMD device 400 may be transformed to operate the right and left lenses 404 and 405 as display units. In this case, the right and left lenses 404 and 405 may be configured as transparent display units or semi-transparent display units. If the right and left lenses 404 and 405 are configured as semi-transparent display units, the right and left lenses 404 and 405 may include at least one optical waveguide (e.g., a prism), an electroluminescent display unit, or a Liquid Crystal Display (LCD) unit. However, the present invention is not limited thereto.

Figure 5:
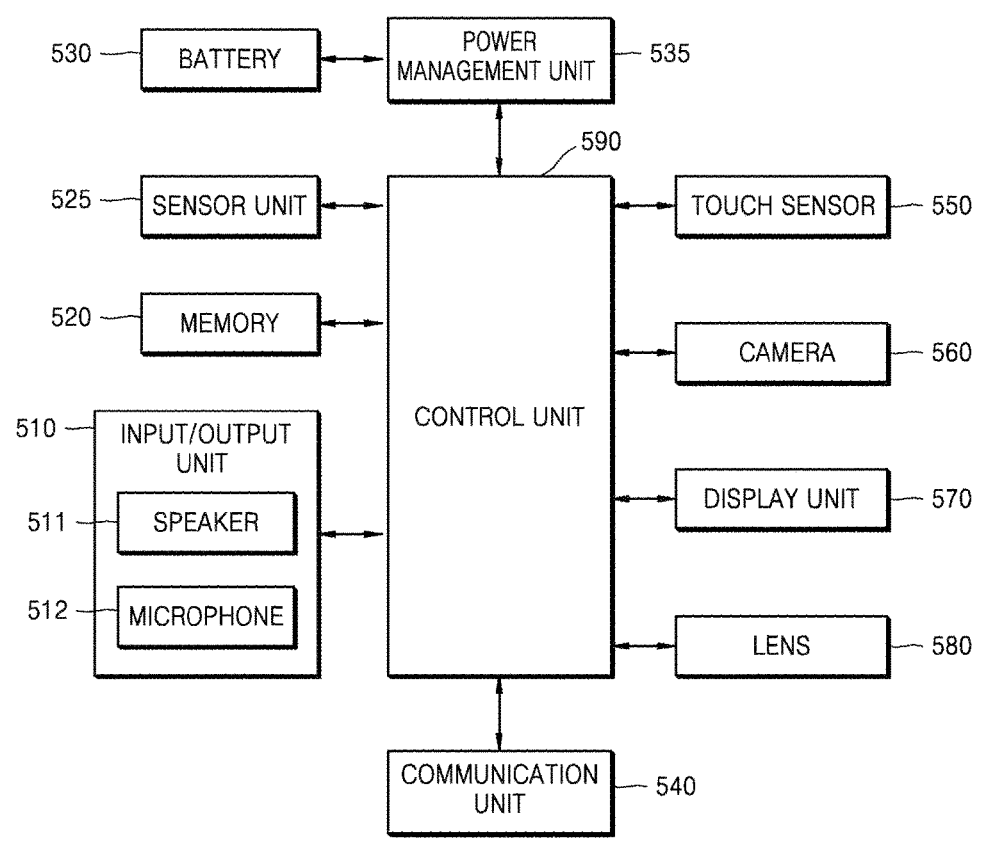
FIG. 5 is a block diagram of an HMD device according to an embodiment of the present invention.

FIG. 5 is a block diagram of an HMD device 500 according to an embodiment of the present invention.

Referring to FIG. 5, the HMD device 500 according to an embodiment of the present invention may include an input/output unit 510, a memory 520, a sensor unit 525, a battery 530, a power management unit 535, a communication unit 540, a touch sensor 550, a camera 560, a display unit 570, a lens 580, and a control unit 590.

The input/output unit 510 includes units for receiving an input from a user, providing information to the user, receiving data externally, and outputting data externally. The input/output unit 510 may include at least one speaker 511, at least one microphone 512, at least one of a button, a connector, and a keypad, or a combination thereof. However, the present invention is not limited thereto.

The speaker 511 may output sounds corresponding to various data from the HMD device 500 under the control of the control unit 590. Furthermore, the speaker 511 may output sounds corresponding to functions performed by the HMD device 500. The speaker 511 may be arranged at a suitable location of the HMD device 500 or a plurality of speakers 511 may be arranged at suitable locations of the HMD device 500. According to an embodiment of the present invention, the speaker 511 may be configured as an earphone as shown in FIG. 2.

The microphone 512 may receive a voice or a sound external to the HMD device 500, generate an electrical signal based on the received voice or the received sound, and output the generated electrical signal to the control unit 590. The microphone 512 may be arranged at a suitable location of the HMD device 500 or a plurality of microphones 512 may be arranged at suitable locations of the HMD device 500. Throughout the present disclosure, a signal may also be referred to as data and data may also be referred to as a data signal.

The sensor unit 525 may include at least one sensor for detecting a state of the HMD device 500 or a state of the surrounding environment. For example, the sensor unit 525 may include at least one of a proximity sensor for detecting a user that approaches the HMD device 500, a motion/direction sensor for detecting motion of the HMD device 500 (e.g., rotation, acceleration, deceleration, vibration, etc.), an illumination sensor for detecting ambient illumination, a photosensitive sensor for detecting color or a spectrum of light, or a combination thereof. Furthermore, the motion/direction sensor may include at least one of a gravitational sensor, a geomagnetic sensor, a gyro sensor, a shock sensor, a Global Positioning System (GPS) module, a compass, and an acceleration sensor. For example, a GPS module may receive radio signals from a plurality of GPS satellites orbiting the Earth and may calculate a location of the HMD device 500 by using the times of arrival of radio signals from the GPS satellites to the HMD device 500.

The power management unit 535 may supply power to the HMD device 500 under the control of the control unit 590. The power management unit 535 may be connected to one or more batteries 530. Furthermore, the power management unit 535 may supply power, which is input from an external power source via a cable, to the HMD device 500.

The communication unit 540 may be a wire communication unit, a wireless communication unit, or a wire/wireless communication unit and may transmit data from the control unit 590 to an external device over a wire or wirelessly via an external communication network or over the air, receive data from an electronic device over a wire or wirelessly via an external communication network or over the air, and transmit the received data to the control unit 590. According to an embodiment of the present invention, the communication unit 540 may include at least one of a mobile communication module, a wireless Local Area Network (LAN) module, and a close-distance communication module.

The mobile communication module may perform a communication with an external device via a mobile communication network by using at least one antenna under the control of the control unit 590. The mobile communication module may transmit or receive wireless signals for a voice call, a video call, a Short Message Service (SMS), or a Multimedia Message Service (MMS) to and from a mobile phone, a smart phone, a tablet Personal Computer (PC), or other communication devices having a network address, such as an Internet Protocol (IP) address, or a phone number.

The wireless LAN module may be connected to the Internet via a wireless Access Point (AP) around the AP under the control of the control unit 590. The wireless LAN module may support the wireless LAN standard IEEE802.11x of the Institute of Electrical and Electronics Engineers (IEEE).

The close-distance communication module may perform a wireless close-distance communication with an external communication device under the control of the control unit 590. Close-distance communication methods may be Bluetooth™, an Infrared Data Association (IrDA) standard, Wireless Fidelity (Wi-Fi) Direct communication, a Near Field Communication (NFC), or a combination thereof.

The touch sensor 550 may transmit a signal corresponding to at least one touch input to the control unit 590. A user may contact the touch sensor 550 by using a body part (e.g., a finger) or another touch input unit, and the touch sensor 550 may receive a touch input by detecting the contact of the user. Furthermore, the touch sensor 550 may receive an input based on successive touches at a touch location (e.g., a drag input). Touch input information may include touch coordinates and/or a contact state. The contact state may be a state wherein a body part contacts the touch sensor 550, a state wherein a body part is separated from the touch sensor 550, or a drag state wherein a body part slides on the touch sensor 550 while the body part contacts the touch sensor 550. The control unit 590 may determine user input information, e.g., selecting or moving a menu item or an item, a handwriting input, etc., based on a touch input. The control unit 590 may perform a function (e.g., establishing a phone call, photographing, selecting a menu, composing/reading a message, transmitting data, etc.) corresponding to a touch input.

However, in the present disclosure, a touch input is not limited to an input based on a contact between the touch sensor 550 and a touch input device. A touch input may include a contactless input (e.g., the touch sensor 550 and a touch input device are separated from each other). Such a contactless input may also be referred to as a hovering input.

The touch sensor 550 may be embodied as a resistive type, a capacitive type, an infrared type, an acoustic wave type, an ElectroMagnetic Resonance (EMR) type, or a combination thereof.

The camera 560 may include a lens system and an image sensor and may further include a flash. The camera 560 may transform light input (or picked up) via the lens system into electrical image signals and output the transformed image signals to the control unit 590. A user may acquire moving pictures or still images by using the camera 560. Furthermore, the camera 560 may also be used to receive an input based on a motion or a gesture of a user.

The lens system may form an image of an object by converging light received externally. The lens system includes at least one or more lenses, where the each of the lenses may be a convex lens, an aspheric lens, etc. The lens system is symmetrical with respect to an optical axis extending from the center of the lens system, wherein the optical axis may be defined as the center axis of the lens system. An image sensor may transform an optical image formed based on an external light input via the lens system into electrical image signals. The image sensor may include a plurality of pixel units arranged in a M×N matrix shape. Each of the pixel units may include a photodiode, and a plurality of transistors. The pixel units accumulate charge generated by an input of light, and a voltage based on the accumulated charge may indicate an intensity of brightness of the input of light. In the case of processing a still image or an image constituting moving pictures, an image signal output by an image sensor consists of a set of voltages (that is, pixel values) output by pixel units, and an image signal may indicate one frame (that is, a still image). Furthermore, a frame may include M×N pixels. An image sensor may be a Charge-Coupled Device (CCD) image sensor or a Complementary Metal-Oxide Semiconductor (CMOS) image sensor.

According to a control signal received from the control unit 590, an image sensor may operate all pixels of the image sensor or only pixels in an area of interest. Image data output by the pixels may be output to the control unit 590.

The control unit 590 may process an image input from the camera 560, an image stored in the memory 520, or an image formed by the control unit 590 using data stored in the memory 520 frame by frame. The control unit 590 may output frames of an image externally via the display unit 570 or store frames of an image in the memory 520. In the present disclosure, images output by the display unit 570 may be visual contents including moving pictures or still images or a Graphical User Interface (GUI).

The display unit 570 may be embodied in any of various forms according to an embodiment of the present invention. For example, the display unit 570 may display an image by forming an image on the retina of a user according to various optical system principles. Alternatively, the display unit 570 may include a transparent display unit and display an image on the transparent display unit.

The lens 580 according to an embodiment of the present invention may be configured to be attachable to and detachable from the HMD device 500 as shown in FIG. 1. In other words, the lens 580 may not be included in the HMD device 500, and only a structure for mounting the lens 580 may be included in the HMD device 500. A user may change the color of the lens 580 of the HMD device 500 by switching the lens 580 to one with a different color. Alternatively, the lens 580 according to an embodiment of the present invention may be a smart window of which color and transmissivity may be modified under the control of the control unit 590.

Figure 6:
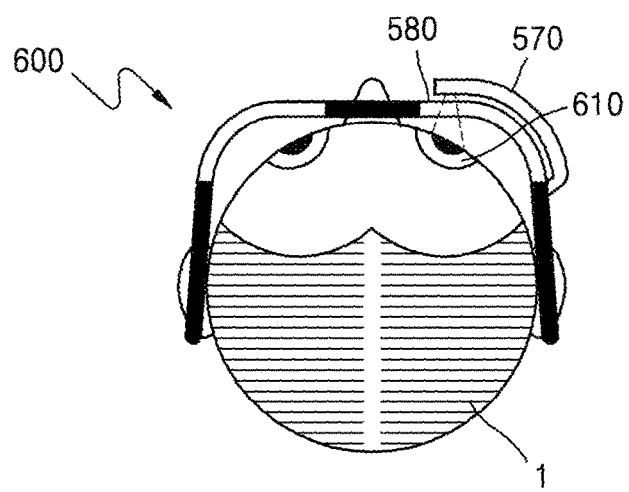
FIG. 6 is a diagram of a method of an HMD device to display an image according to an embodiment of the present invention.

FIG. 6 is a diagram of a method of an HMD device 600 to display an image according to an embodiment of the present invention. The HMD device 600 according to an embodiment of the present invention may include the display unit 570 including an optical system. The display unit 570 according to an embodiment of the present invention may display an image by forming an image on an eye 610 of a user 1 by irradiating light via the lens 580.

Figure 7:
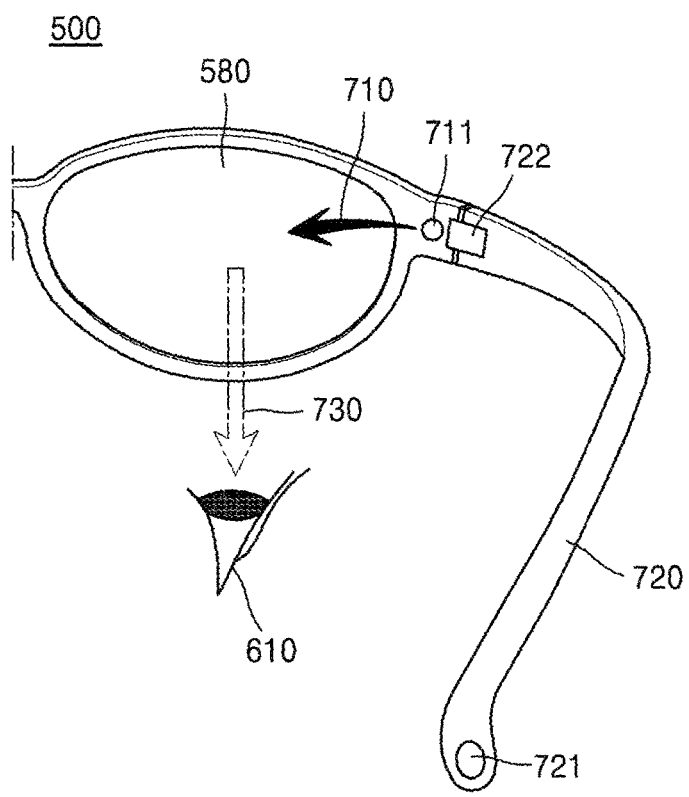
FIG. 7 is a diagram of a portion of an HMD device according to an embodiment of the present invention.

FIG. 7 is a diagram of a portion of an HMD device 500 according to an embodiment of the present invention.

Referring to FIG. 7, the HMD device 500 may include a frame 720 for attaching the lens 580. According to an embodiment of the present invention, the frame 720 may have a structure in which the frame 720 is connected via a hinge 722. An opening 711, which is a path for outputting a projected light 710 output by a projector included in a display unit included in the frame 720 externally from the frame 720, may be arranged on the inner surface of the frame 720. In this case, a glass member or a transparent plastic member for preventing introduction of dust into the frame 720 may be arranged at the opening 711.

Furthermore, at least one speaker may be arranged on the inner surface of the frame 720.

A projector outputs the projected light 710 for forming a virtual image. The projected light 710 output by the projector is focused and reflected by the lens 580, and a focused and reflected projected light 730 may form a virtual image on the retina of the eye 610 of a user. In this case, focusing may refer to the collimation of light. The focusing may include convergence of light to a point or reduction of beam spots of light. The reflected projected light 730 may converge onto the lens or the pupil of the eye 610. An HMD device 500 may use a plurality of projectors for forming virtual images on both eyes of a user, respectively.

Figure 8:
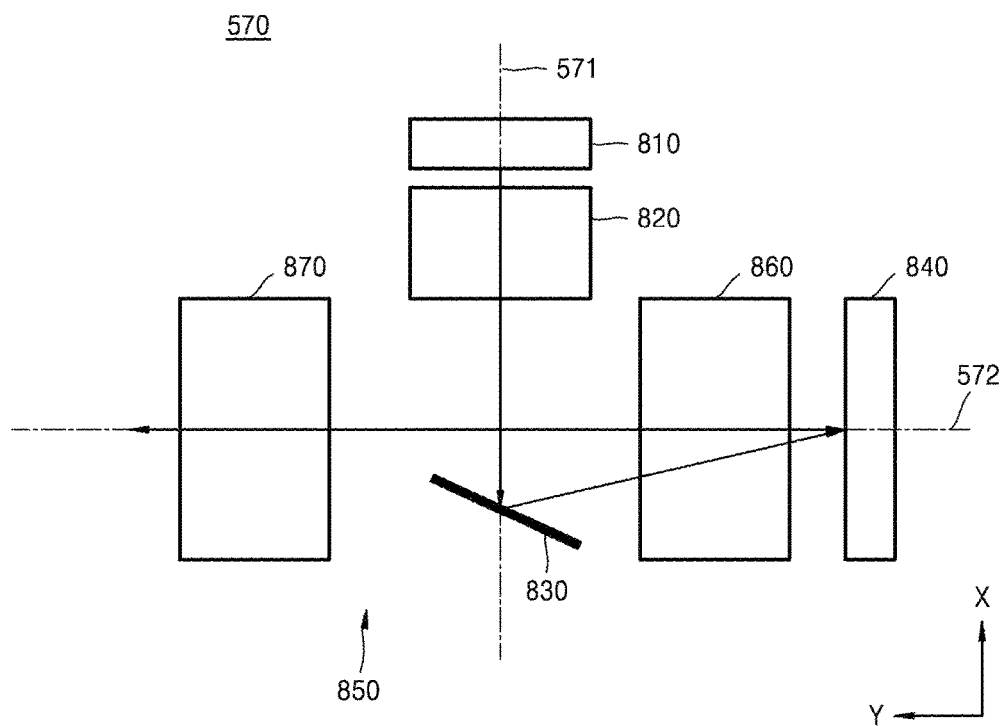
FIG. 8 is a block diagram of a display unit according to an embodiment of the present invention.

FIG. 8 is a block diagram of a display unit according to an embodiment of the present invention. In detail, FIG. 8 is a block diagram showing the structure of a projector in a case where the display unit includes the projector.

Referring to FIG. 8, if the display unit 570 includes a projector, the display unit 570 includes a light source 810, an illumination optical system 820 for illuminating a display device 840 by using light output by the light source 810, a mirror 830 for reflecting light transmitted through the illumination optical system 820, the display device 840 for forming a virtual image by reflecting light reflected by the mirror 830 pixel by pixel, and a projection optical system 850 for projecting light reflected by the display device 840 externally.

The illumination optical system 820 may be arranged along a first optical axis 571 parallel to an x-axis. The illumination optical system 820 may include at least one collimating lens, at least one filter, at least one equalization lens, a focusing lens, or a combination thereof.

Optical elements (e.g., a lens, a prism, a filter, etc.) of the illumination optical system 820 may be aligned along the first optical axis 571. Generally, an optical axis may refer to an axis along which no optical change occurs in an optical system when the optical system is rotated around it. When optical elements are aligned along an optical axis the curvature centers of the optical elements constituting the optical system are located on, the optical axis or centers of symmetry of the optical elements are located on the optical axis.

The light source 810 may output light that travels along the first optical axis 571. For example, at least one Light Emitting Diode (LED) that outputs white light, a light of a primary color (i.e., blue, red, and yellow), or light of a combination of primary colors (e.g., purple, green, orange, etc.) may be used as the light source 810.

The illumination optical system 820 may collimate, filter, and/or focus light input from the light source 810 and output processed light to the mirror 830.

The mirror 830 may reflect light input via the illumination optical system 820 toward the display device 840. The mirror 830 may have a structure in which a highly-reflective dielectric layer or a highly-reflective metal layer is deposited on a substrate.

The display device 840 may display an image pixel by pixel based on data input by the control unit 590. The display device 840 may include pixel elements in correspondence to a pre-set resolution. The display device 840 displays an image by turning the pixel elements "ON" and "OFF." For example, a Digital Micro-mirror Device (DMD) including micro-mirrors arranged in an M×N matrix shape may be used as the display device 840. Each micro-mirror may be rotated to a position corresponding to the "ON" state and a position corresponding to the "OFF" state according to a driving signal. Each micro-mirror may reflect an incident light at an angle that is displayed externally of the display device 840 in the "ON" state and may reflect an incident light at an angle that is not displayed externally of the display device 840 in the "OFF" state.

The projection optical system 850 may be arranged along a second optical axis 572 that is parallel to a y-axis. The projection optical system 850 may include a relay lens 860 and a projection lens 870. The relay lens 860 and the projection lens 870 may be aligned on the second optical axis 572.

The relay lens 860 may align light reflected by the mirror 830 toward the display device 840 in consideration of light overfilling. In other words, the relay lens 860 may allow a light reflected by the mirror 830 to be incident on an area larger than an area occupied by pixel elements of the display device 840.

Furthermore, the relay lens 860 may receive light reflected by the display device 840, reduce a beam spot size of the light, and output the processed light. Since light reflected by the display device 840 has a large beam spot size, the light may not be transmitted to the projection lens 870 due to light loss. The relay lens 860 focuses light reflected by the display device 840 and reduces beam spot size thereof, and thus more light may be transmitted to the projection lens 870.

The projection lens 870 may receive light transmitted through the relay lens 860, collimate or focus the received light, and project the processed light externally.

Figure 9:
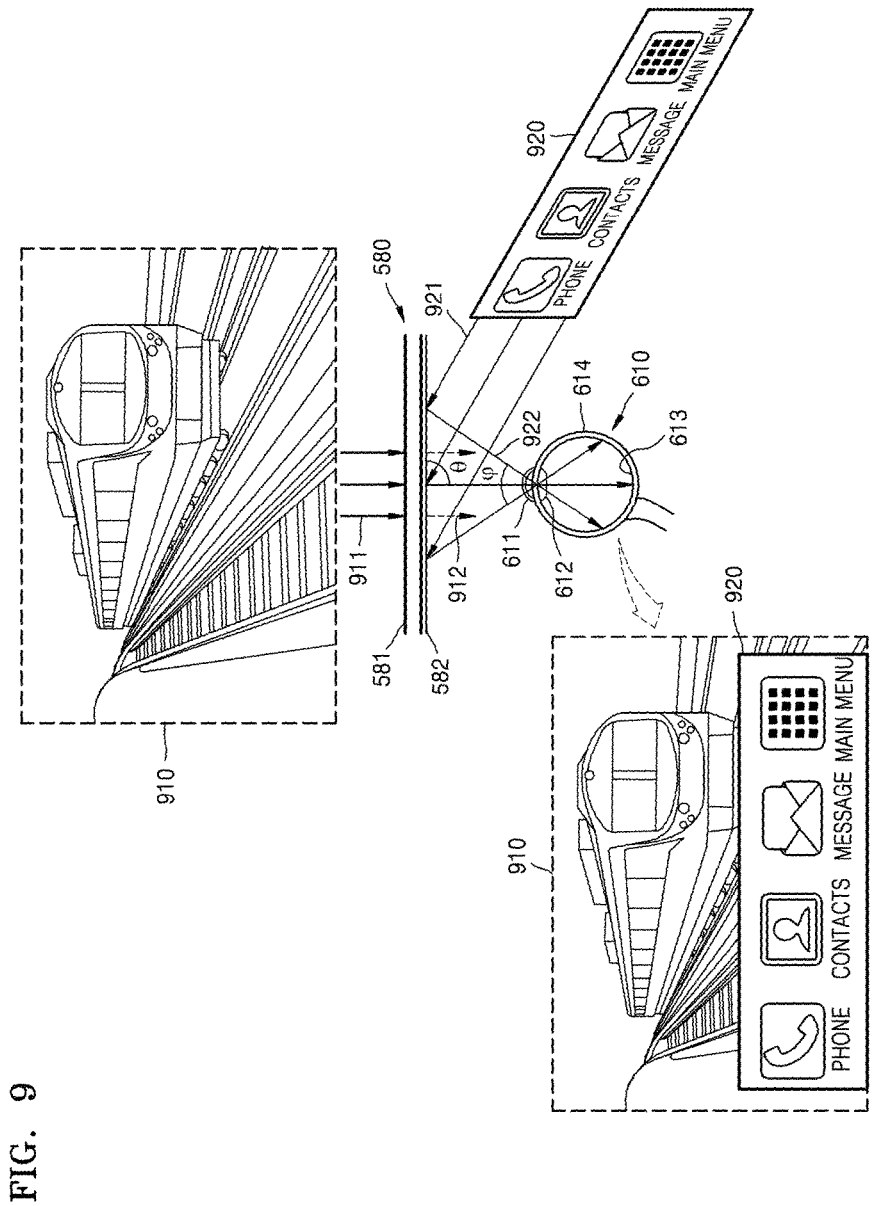
FIG. 9 is a diagram of a lens according to an embodiment of the present invention.

FIG. 9 is a diagram of a lens capable of changing a color or a transmissivity according to an embodiment of the present invention.

Referring to FIG. 9, the lens 580 according to an embodiment of the present invention may change a color or a transmissivity thereof. The lens 580 according to an embodiment of the present invention may include glass 581 capable of changing transmissivity thereof (that is, color or transmissivity of the glass 581 is modified based on a signal applied thereto) and a Holographic Optical Element (HOE) 582 that functions as a concave mirror.

The lens 580 may transmit an ambient light 911 input externally therethrough and may reflect and focus a light 921 output by the display unit 570.

A transmitted ambient light 911 and the light 921 reflected by the lens 580 are input to the eye 610 of a user, and a surrounding environment image 910 based on a transmitted ambient light 912 and a displayed image 920 (based on a reflected light) may be overlappingly formed on the retina 613 of the eye 610. In other words, the user sees an image formed as the surrounding environment image 910 and the displayed image 920 overlap each other. A user may recognize as if the displayed image 920 is floating on a transparent layer on the surrounding environment image 910. The displayed image 920 may include a still GUI including menus and icons corresponding to a phone call, contact information, a message, a main menu, or may include a content image including a still image or a moving picture. Although an area in which the displayed image 920 is displayed is shown as a non-transparent area in FIG. 9, the area in which the displayed image 920 is displayed may have a transparency to allow the user to see the surrounding environment image 910 in the area in which the displayed image 920 is displayed. In other words, a transparency of the area in which the displayed image 920 is displayed may vary according to embodiments of the present invention.

The light 921 output by the display unit 570 may be a parallel light having a wavelength λ (that is, a collimated light). The light 921 may be incident to the HOE 582 to form an angle θ with a normal of the HOE 582. The HOE 582 may be an element with wavelength selectivity. The HOE 582 may reflect and focus a light of the wavelength λ (that is, the light 921 according to the present invention) and may transmit light of a wavelength different from the wavelength λ (that is, the ambient light 911 according to the present invention) therethrough without converging the same.

The HOE 582 may reflect and focus the input light 921. Furthermore, the reflected light 922 from the HOE 582 may converge on a location corresponding to the eye 610, which is a certain distance (that is, an eye relief) apart from the HOE 582. The reflected light 922 may converge on a location corresponding to a pupil 611 or an eye lens 612 of the eye 610. In this case, the converged light 922 may have a converging angle or a viewing angle φ. The eye lens 612 controls focus of a light incident on the eye 610, and since the transmitted ambient light 912 is converged at a location corresponding to the pupil 611 or the eye lens 612, the transmitted ambient light 912 may be projected onto a retina 613, without being converged by the eye lens 612, and form the image 920.

Although the light 921 incident to the HOE 582 is described above as a parallel light, the present invention is not limited thereto. If the reflected light 922 from the HOE 582 converges on a location corresponding to the pupil 611 or the eye lens 612, the light 921 may not be a parallel light, but a diverging light or a converging light.

If a user wearing an HMD device squints his/her eyes to see actual objects in his surroundings, an image displayed by the HMD device (a virtual object) may not be clearly formed on the retina of the user. In this case, the user is unable to clearly see an actual object and a virtual object at the same time, and thus, augmented reality may not be implemented. Furthermore, a focus inconsistency between an actual object and a displayed image may increase the fatigue of the user due to an inconsistency between the convergence of the eyes and a focus adjustment of a single eye.

An HMD device according to an embodiment of the present invention may converge a projected light for forming a virtual image on a pupil, an eye lens, or a location close to the same, thereby reducing a focus change of the projected light based on the eye lens. If a projected light may be directly projected to a retina regardless of an action of an eye lens, an image projected to a retina may be recognized by a user as a clear image regardless of a focus adjustment and aberration of an eye lens.

The HOE 582 may have a focal distance corresponding to a distance between the pupil 611 or the eye lens 612 and the HOE 582.

Figure 10:
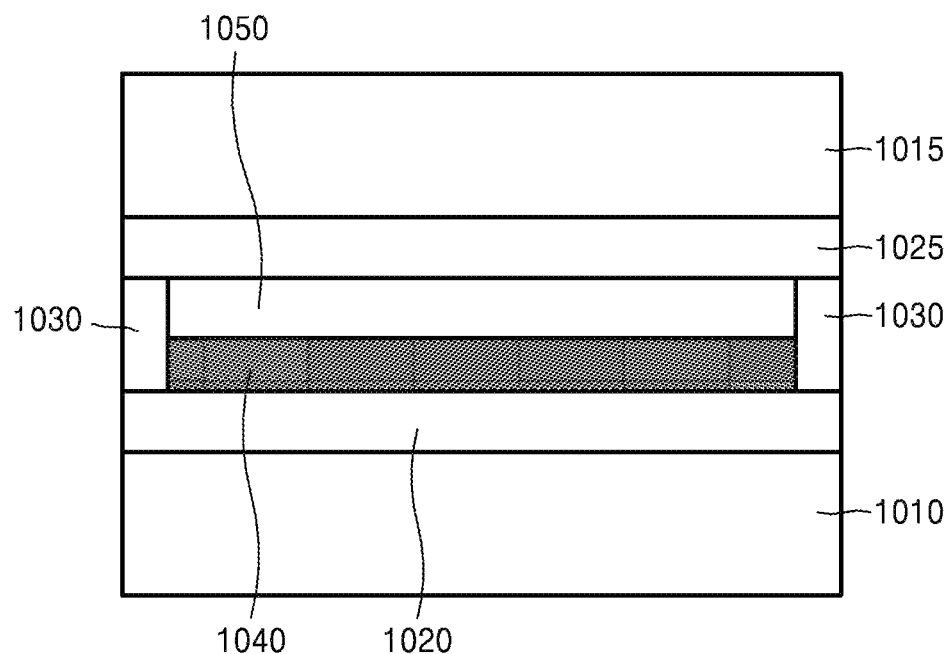
FIG. 10 is a diagram of a glass included in a lens of an HMD device according to an embodiment of the present invention.

FIG. 10 is a diagram of the glass 581 included in a lens of an HMD device according to an embodiment of the present invention. Transmissivity or color of the glass 581 according to an embodiment of the present invention may be modified based on a signal or a voltage applied thereto by the control unit 590.

An electrochromic glass, a Suspended Particle Device (SPD, or a Liquid Crystal (LC) may be used as the glass 581. Alternatively, if necessary, a photochromic glass or a thermochromic glass, of which transmissivity is passively modified based on a wavelength of light or a change of temperature instead of being actively controlled via application of a signal, may be used as the glass 581.

The glass 581 may be fabricated using various methods. For example, the glass 581 may be fabricated by applying a material of which transmissivity may be controlled onto a glass or attaching a thin film of which transmissivity may be controlled to a glass.

A case in which an electrochromic glass is used as the glass 581 will be described below with reference to FIG. 10.

The glass 581 includes first and second insulating substrates 1010 and 1015, a first conductive electrode 1020 deposited on the top surface of the first insulating substrate 1010, a second conductive electrode 1025 deposited on the bottom surface of the second insulating substrate 1015, an insulating spacer 1030, which separates the first and second insulating substrates 1010 and 1015 from each other and seals a space therebetween, and a electrochromic layer 1040 and an electrolyte 1050, which fills a space between the first and second insulating substrates 1010 and 1015.

The first and second insulating substrates 1010 and 1015 may be formed of a transparent glass or a transparent plastic. For example, the transparent plastic may include at least one of polyacrylate, polyethylene ether phthalate, polyethylene naphthalate, polycarbonate, polyarylate, polyetherimide, polyethersulfone, and polyimide.

The first conductive electrode 1020 may be formed of a transparent conductor. For example, the first conductive electrode 1020 may contain an inorganic conductive material, such as Indium Tin Oxide (ITO), Fluorine-doped Tin Oxide (FTO), or an Antimony-doped Tin Oxide (ATO), or an organic conductive material, such as polyacetylene or polythiophene.

The second conductive electrode 1025 may be formed of a transparent or non-transparent conductive material. For example, the second electrode 1025 may contain ITO, FTO, a metal like aluminum (Al), ATO, or a combination thereof.

The electrochromic layer 1040 containing an electrochromic material may be arranged on the first conductive electrode 1020. The electrochromic layer 1040 may be arranged on the first electrode 1020 as a film, but is not limited thereto.

The first insulating substrate 1010 and the second insulating substrate 1015 may be fixed to the insulating spacer 1030. A space between the first insulating substrate 1010 and the second insulating substrate 1015 may be filled with the electrolyte 1050. The electrolyte 1050 may include an oxidizing/reducing material that reacts with the electrochromic material. The electrolyte 1050 may be a liquid electrolyte or a solid electrolyte. A solution formed by a lithium salt, such as lithium hydroxide (LiOH) or lithium perchlorate $LiClO_4$, a potassium salt, such as potassium hydroxide (KOH), or a sodium salt, such as sodium hydroxide (NaOH), may be used as a liquid electrolyte. Meanwhile, (poly(2-acrylamido-2-methylpropane sulfonic acid) or Poly(ethylene) Oxide (PEO) may be used as a solid electrolyte, for example.

A material constituting the electrochromic layer 1040, that is, an electrochromic material, may contain a metal-organic composite, which is a combination of a metal and an organic compound including a functional group capable of forming coordination with the metal. The metal may include a light metal, a transition metal, a lanthanide metal, an alkali metal, or a combination thereof. For example, the metal may include beryllium (Be), barium (Ba), copper (Cu), zinc (Zn), cerium (Ce), magnesium (Mg), aluminum (Al), titanium (Ti), or a combination thereof. Furthermore, for example, the functional group may include a carboxyl group, a pyridine group, an imidazole group, or a combination thereof. Furthermore, for an example, the organic compound may include a viologen derivative, an anthraquinone derivative, or a combination thereof.

Figure 11:
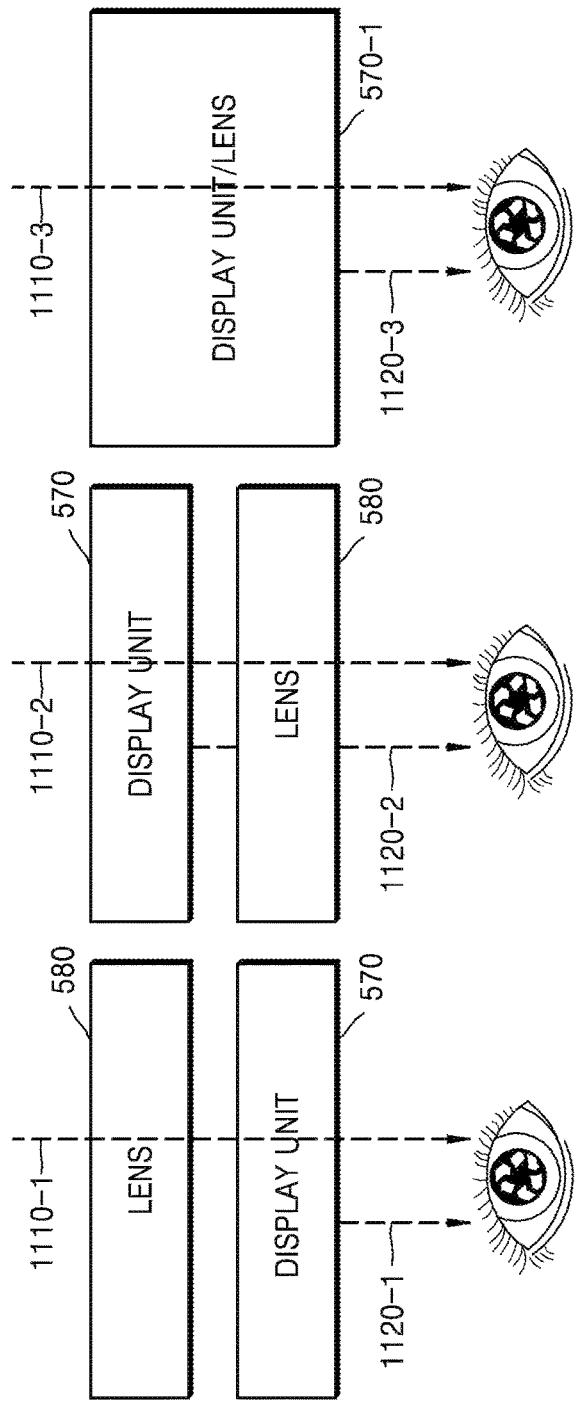
FIGS. 11A to 11C are diagrams of a method of an HMD device to display an image according to an embodiment of the present invention.

FIGS. 11A to 11C are diagrams of a method of an HMD device to display an image according to an embodiment of the present invention.

Referring to FIG. 11A, the display unit 570 may be arranged between the lens 580 and an eye of a user. The display unit 570 may include a transparent display capable of transmitting light therethrough.

Light 1110-1 of a surrounding environment may be transmitted through the lens 580 and the display unit 570 and be incident to an eye of a user, and a light 1120-1 generated by the display unit 570 may be directly incident to an eye of a user without being transmitted through the lens 580.

Alternatively, with reference to FIG. 11B, the lens 580 may be arranged between the display unit 570 and an eye of a user. In this case, light 1110-2 of a surrounding environment may be transmitted through the lens 580 and the display unit 570 and incident to the eye of the user. A light 1120-2 generated by the display unit 570 may be transmitted through the lens 580 and incident to an eye of a user. In this case, since both light 1110-2 of the surrounding environment and the light 1120-2 generated by the display unit 570 are transmitted through the lens 580 and incident to an eye of a user, an HMD device may modify an image in consideration of colors recognized by the user from the light 1120-2 generated by the display unit 570 and transmitted through the lens 580.

Alternatively, with reference to FIG. 11C, the display unit 570 and the lens 580 may be integrated with each other as a display unit/lens 570-1. In this case, a color or transmissivity of the display unit/lens 570-1 may be controlled and the display unit/lens 570-1 may be configured as a smart window capable of displaying an image. Light 1110-3 of a surrounding environment may be transmitted through the display unit/lens 570-1 and incident to an eye of a user. Furthermore, a light 1120-3 generated by the display unit/lens 570-1 may be directly incident to an eye of a user.

Figure 12:
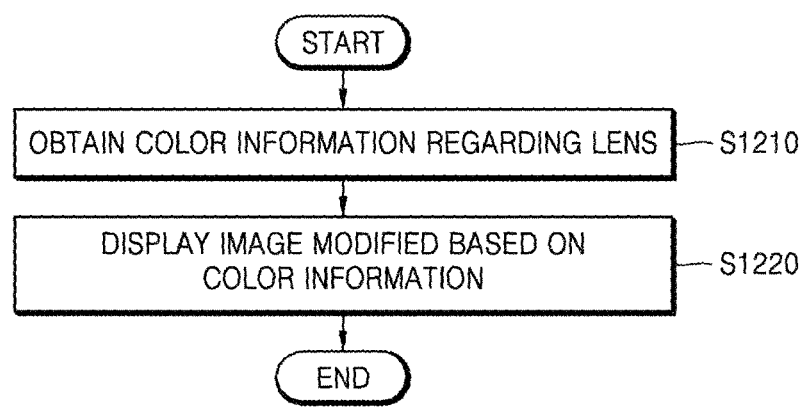
FIG. 12 is a flowchart of a method of an HMD device to display an image according to an embodiment of the present invention.

FIG. 12 is a flowchart of a method of an HMD device to display an image according to an embodiment of the present invention.

Referring to FIG. 12, the HMD device may obtain color information regarding a lens in step S1210. The color information regarding the lens may refer to identification information for the HMD device to identify the color of the lens. For example, the color information regarding the lens may include Red-Green-Blue (RGB) values indicating a color of the lens. The color information may vary according to an embodiment of the present invention. For example, the color information may be information instructing a color of a lens. Alternatively, according to an embodiment of the present invention, the color information may instruct a color that is recognized as a color of a background around an image displayed by an HMD device. In this case, color of a light transmitted through a lens is detected by a photosensitive sensor arranged at the HMD device, and thus the HMD device may obtain color information instructing a color recognized as a background color. In this case, the color information instructing a color recognized as a background color may also be referred to as color information regarding an image display area.

An HMD device may obtain color information regarding a lens using various methods. For example, if the HMD device is lens-interchangeable, the HMD device may obtain the color of a replaced lens when a lens is interchanged. Furthermore, according to an embodiment of the present invention, if a lens is a smart window of which transmissivity or color may be modified under the control of a control unit of the HMD device, the HMD device may control the color of the lens, and thus a current color of the lens may be obtained.

Next, the HMD device may modify an image based on color information obtained in step S1210 and display the modified image via a display unit in step S1220. For example, when the HMD device displays an image including text and the obtained color information regarding a lens indicates yellow, the HMD device may modify the color of the text to blue, which is the complementary color of yellow, and display the modified text in blue via a display unit.

If a lens may be attached to and detached from an HMD device or the HMD device is capable of controlling the color of a lens, the HMD device may obtain color information regarding the lens in step S1210. However, if a lens is integrated with an HMD device and the color of the lens is unchangeable, color information regarding the lens may be pre-set. In other words, if a fixed-color lens is integrated with an HMD device, the HMD device may correct the color of an image based on the pre-set color information regarding the lens. For example, if a blue lens is fixed to an HMD device, the HMD device may modify the color of an image to red, which is the complementary color of blue, without obtaining color information regarding the lens and display the modified image.

Figure 13:
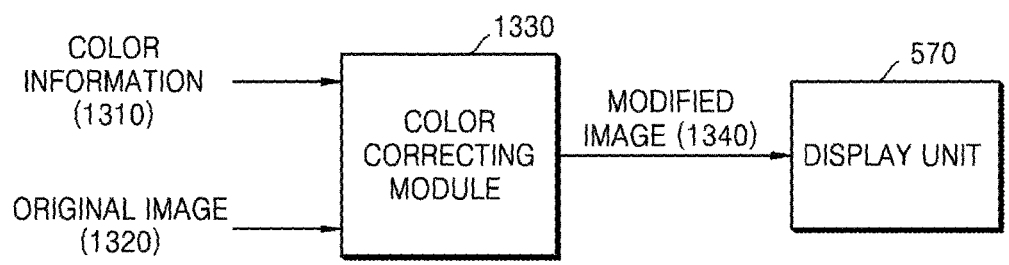
FIG. 13 is a block diagram for modifying and displaying an image according to an embodiment of the present invention.

FIG. 13 is a block diagram for modifying and displaying an image according to an embodiment of the present invention.

Referring to FIG. 13, an HMD device according to an embodiment of the present invention may include a color correcting module 1330. The color correcting module 1330 may display a modified image 1340 generated by modifying the color of an original image 1320 based on color information 1310 regarding a lens and the original image 1320. In this case, the color correcting module 1330 according to an embodiment of the present invention may use the control unit 590. For example, the color correcting module 1330 may include a processor loaded with a program for generating the modified image 1340.

The color correcting module 1330 may modify the original image 1320 using various methods according to an embodiment of the present invention. For example, if the original image 1320 includes text, the color correcting module 1330 may modify the original image 1320 to display the text in a complementary color of the color of a lens.

However, modification of an image by the color correcting module 1330 is not limited to modification of the color of the original image 1320. For example, the color correcting module 1330 may increase or decrease the size of an object (e.g., a GUI object like an icon) included in the original image 1320. As another example, the color correcting module 1330 may change the shape of an object (e.g., a GUI object like an icon) included in the original image 1320.

If a lens is integrated with an HMD device and it is unable to change the color of the lens, the color information 1310 may not be separately input to the color correcting module 1330 but may be pre-set. The color correcting module 1330 may modify an image based on pre-set color information. In other words, if a lens with a fixed color is integrated with an HMD device, the color correcting module 1330 may modify an image based on the pre-set color information regarding the lens. For example, if a blue lens is fixed to an HMD device, the color correcting module 1330 may modify the color of an image to red, which is the complementary color of blue, without obtaining color information regarding the lens and display the modified image.

The display unit 570 may display the modified image 1340 output by the color correcting module 1330.

An HMD device may obtain color information regarding a lens using various methods according to an embodiment of the present invention. For example, an HMD device may obtain color information regarding a lens by using a metal line included in the lens, a code printed on the lens, a photosensitive sensor, or an image picked up by a camera. In this case, obtaining color information regarding a lens may include a case in which color information regarding the lens is input by a user or a case in which, as an HMD device controls color or transmissivity of the lens, the HMD device is capable of recognizing color information regarding the lens.

Figure 14:
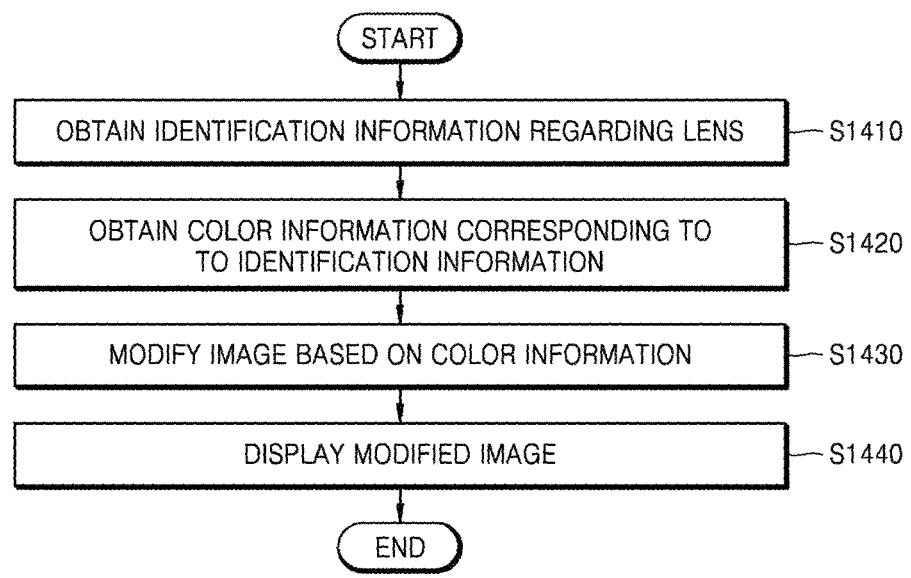
FIG. 14 is a flowchart of a method of obtaining color information regarding a lens according to an embodiment of the present invention.

FIG. 14 is a flowchart of a method of obtaining color information regarding a lens according to an embodiment of the present invention.

Referring to FIG. 14, an HMD device may obtain identification information regarding a lens in step S1410. In this case, identification information regarding a lens refers to information for the HMD device to identify the lens. For example, identification information regarding a lens may be a code allocated based on the type of the lens. Methods for the HMD device to obtain identification information regarding a lens may vary according to an embodiment of the present invention. For example, if a metal line is arranged at a lens, identification information regarding the lens may be obtained based on a location of the metal line. As another example, if a code (e.g., a barcode or a Quick Response (QR) code) is printed on a surface of a lens, an HMD device may obtain identification information regarding the lens from the code printed on the lens.

In this case, obtained identification information regarding a lens may be information allocated based on the color of the lens. For example, identification information regarding a black lens may be "01," and identification information regarding a transparent (e.g. colorless) lens may be "00." In this case, the HMD device may obtain color information regarding a lens corresponding to the obtained identification information.

Next, the HMD device may modify an image to be displayed based on the obtained color information. The HMD device may modify the image using various methods according to an embodiment of the present invention. For example, the HMD device may modify the image, such that a text included in the image is displayed in a complementary color of the color of the lens.

However, modification of an image by the HMD device is not limited to modification of the color of the image. For example, the HMD device may increase or decrease the size of an object (e.g., a GUI object like an icon) included in the image. For another example, the HMD device may change the shape of an object (e.g., a GUI object like an icon) included in the image.

Next, the HMD device may display the modified image in step S1440.

Figure 15:
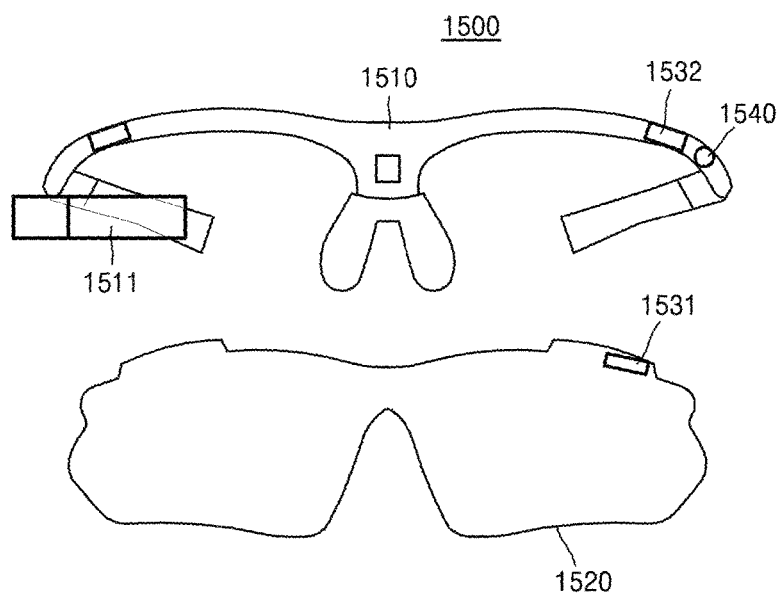
FIG. 15 is a diagram of an HMD device for identifying a lens using a metal line according to an embodiment of the present invention.

FIG. 15 is a diagram of an HMD device 1500 for identifying a lens using a metal line according to an embodiment of the present invention.

Referring to FIG. 15, the HMD device 1500 according to an embodiment of the present invention may include a display unit 1511 and an electrode 1532 arranged at a portion of a frame 1510. A lens 1520 may be attached to and detached from the HMD device 1500 according to an embodiment of the present invention. In this case, the detachable lens 1520 may include a metal line 1531. In this case, the electrode 1532 and the metal line 1531 may be arranged at locations at which the electrode 1532 and the metal line 1531 may contact each other when the lens 1520 is attached to the frame 1510. When the lens 1520 is attached to the frame 1510, the HMD device 1500 may detect the location of the metal line 1531 by using the electrode 1532. The HMD device 1500 may obtain identification information regarding the lens 1520. According to an embodiment of the present invention, a magnet 1540 may be arranged at a portion of the frame 1510 so that the lens 1520 may be fixed to the frame 1510.

Figure 16:
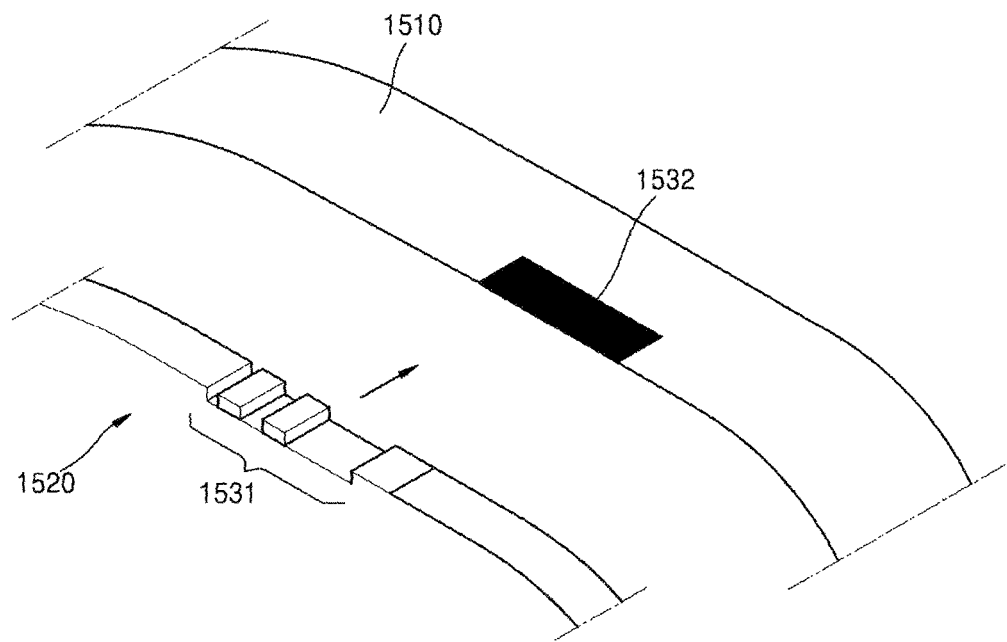
FIG. 16 is a diagram of portions of an HMD device, which includes a metal line, an electrode, and a lens according to an embodiment of the present invention.

FIG. 16 is a diagram of portions of an HMD device 1500, which includes a metal line, an electrode, and a lens according to an embodiment of the present invention.

Referring to FIG. 16, the detachable lens 1520 may include the metal line 1531. In this case, the metal line 1531 may be arranged at a certain location allocated based on the type of the lens 1520. When the lens 1520 is attached to the frame 1510, the metal line 1531 may contact the electrode 1532.

When the metal line 1531 contacts the electrode 1532, the HMD device 1500 may detect the location at which the metal line 1531 is arranged. The HMD device 1500 may obtain identification information regarding the lens 1520 corresponding to the location at which the metal line 1531 is arranged.

Figure 17:
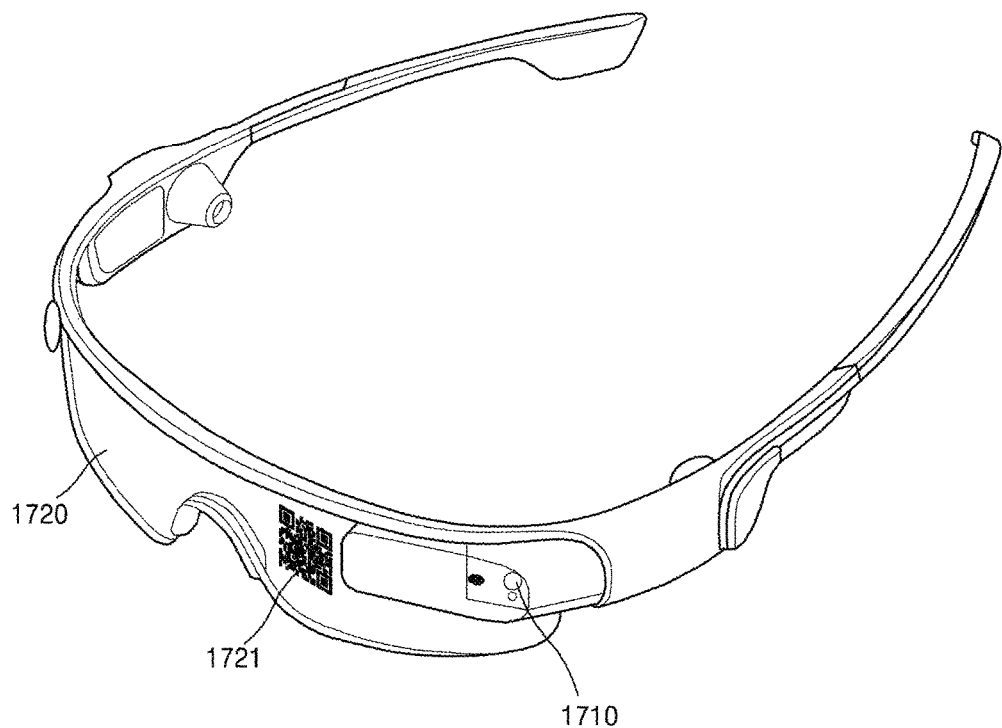
FIG. 17 is a diagram of a method of identifying a lens by using a code printed on the lens according to an embodiment of the present invention.

FIG. 17 is a diagram of a method of identifying a lens by using a code printed on the lens according to an embodiment of the present invention.

Referring to FIG. 17, an HMD device 1700 may obtain identification information regarding a lens 1720 based on a code 1721 included in the lens 1720. Although FIG. 17 shows that the code 1721 is printed on the front surface of the lens 1720, location of the code 1721 may vary according to an embodiment of the present invention.

According to an embodiment of the present invention, the code 1721 may refer to a symbol provided to be optically read by the HMD device 1700. For example, the code 1721 may be a QR code or a barcode. In this case, the HMD device 1700 may pick up an image of a location at which the code 1721 is arranged by using a camera 1710 and obtain identification information regarding the lens 1720 from the picked up image.

Figure 18:
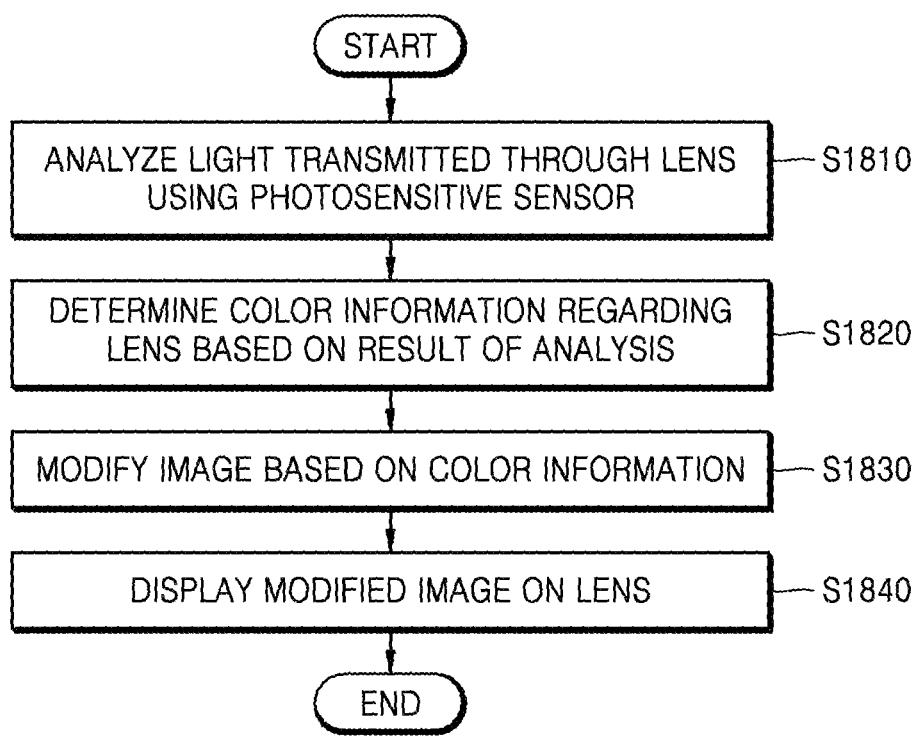
FIG. 18 is a flowchart of a method of obtaining color information regarding a lens by using a photosensitive sensor according to an embodiment of the present invention.

FIG. 18 is a flowchart of a method of obtaining color information regarding a lens by using a photosensitive sensor according to an embodiment of the present invention.

Referring to FIG. 18, an HMD device according to an embodiment of the present invention may include a photosensitive sensor. A photosensitive sensor refers to a sensor capable of detecting light by responding to radiation energy like light. The HMD device may detect light transmitted through a lens via the photosensitive sensor and analyze the detected light in step S1810.

Next, the HMD device may determine color information regarding the lens based on a result of the analysis in step S1820. For example, the HMD device may analyze a spectrum of the light detected by the photosensitive sensor. If the percentage of blue light in the detected light is high, the HMD device may obtain color information corresponding to blue as the color information regarding the lens.

Once color information regarding the lens is obtained, the HMD device may modify an image based on the obtained color information in step S1830 and display the modified image in step S1840.

Figure 19A:
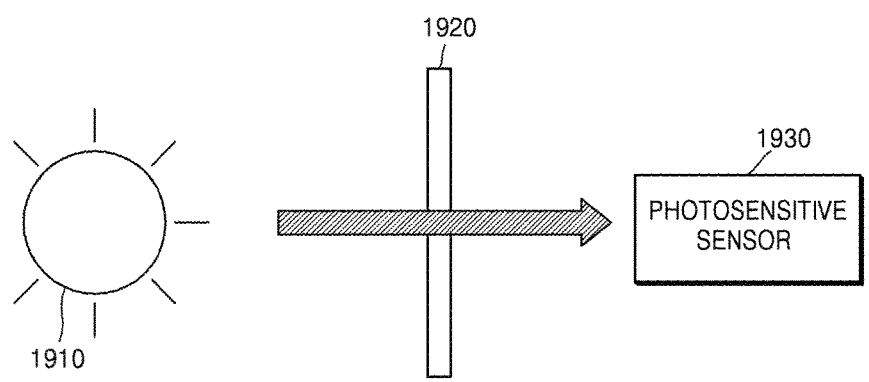
FIGS. 19A and 19B are diagrams of a method of obtaining color information regarding a lens by using a photosensitive sensor according to an embodiment of the present invention.
Figure 19B:
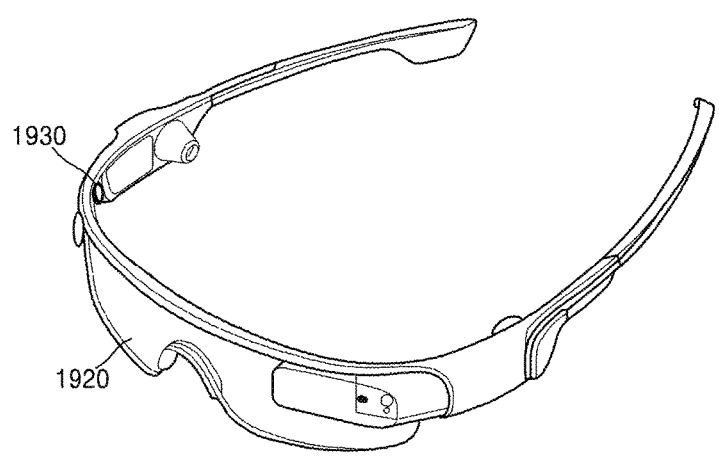

FIGS. 19A and 19B are diagrams showing a method of obtaining color information regarding a lens by using a photosensitive sensor according to an embodiment of the present invention.

Referring for FIGS. 19A and 19B, an HMD device according to an embodiment of the present invention may include a photosensitive sensor 1930 at a location where light emitted by a light source 1910 arranged beyond a lens 1920 of the HMD device may be received. For example, referring to FIG. 19B, the photosensitive sensor 1930 may be arranged at a portion of the frame of the HMD device. The HMD device according to an embodiment of the present invention may obtain color information regarding the lens 1920 as a result of analyzing light transmitted through the lens 1920.

Figure 20:
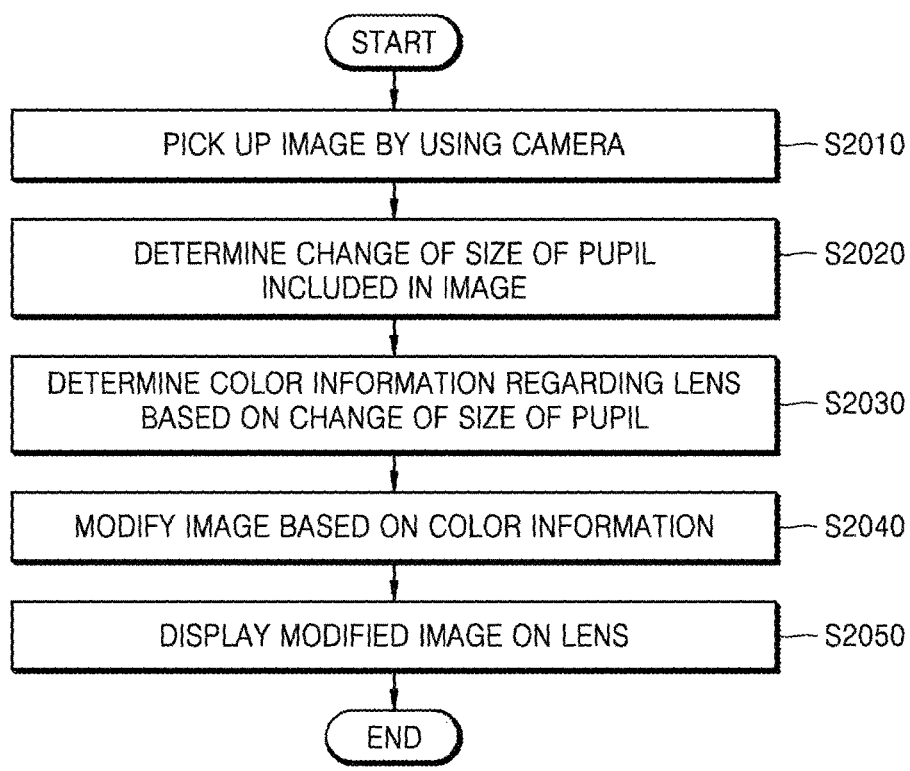
FIG. 20 is a flowchart of a method of obtaining color information regarding a lens based on a size of a pupil of a user according to an embodiment of the present invention.

FIG. 20 is a flowchart of a method of obtaining color information regarding a lens based on a size of a pupil of a user according to another embodiment of the present invention.

Referring to FIG. 20, an HMD device may pick up an image by using a camera in step S2010. In this case, the picked up image may include an image of an eye of a user.

The HMD device may perform image recognition with respect to the picked up image. As a result of the image recognition, the HMD device may obtain a value regarding a size of a pupil included in the image. Based on the obtained value regarding the size of the pupil, a change of the size of the pupil included in the image may be determined in step S2020.

Next, the HMD device may determine color information regarding a lens based on the change of the pupil in step S2030. If transmissivity of the lens is high, a large amount of light may be incident to an eye of a user, and thus the size of the pupil of the user may be reduced. On the contrary, if transmissivity of the lens is low, a small amount of light may be incident to an eye of a user, and thus the size of the pupil of the user may be increased. Based on the mechanism, the HMD device may obtain color information regarding the lens based on the size of the pupil of the user. In other words, if the size of the pupil of the user is large, the HMD device may determine that the lens has a bright color. On the contrary, if the size of the pupil of the user is small, the HMD device may determine that the lens has a dark color.

Once color information regarding the lens is obtained, the HMD device may modify an image based on the obtained color information in step S2040 and display the modified image in step S2050.

Figure 21:
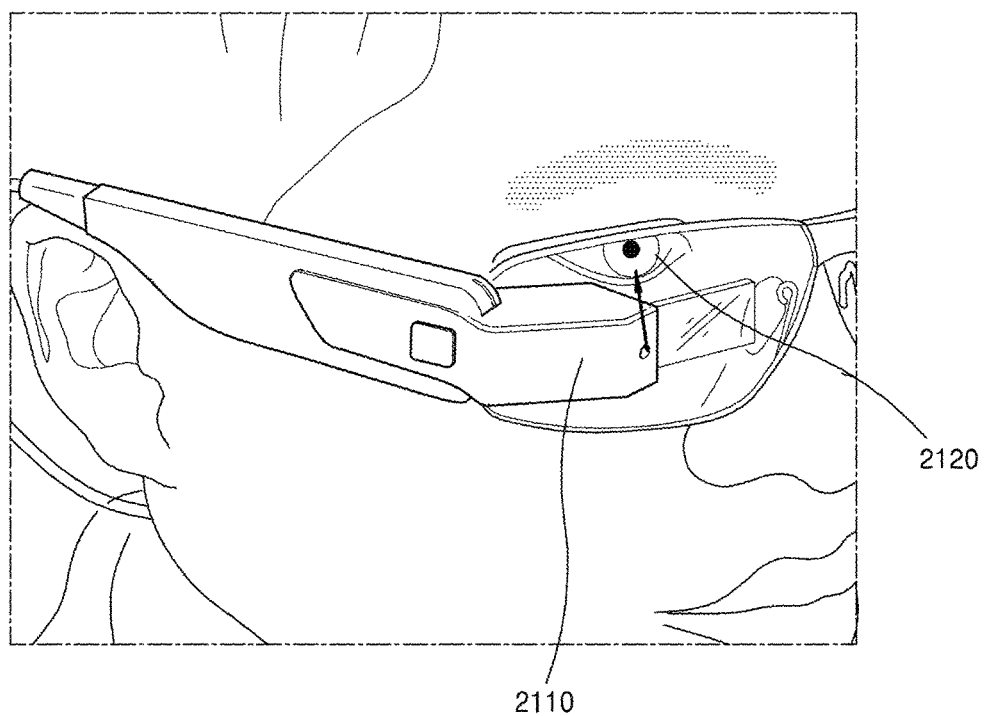
FIG. 21 is a diagram of a method of obtaining color information based on a size of a pupil of a user according to an embodiment of the present invention.

FIG. 21 is a diagram of a method of obtaining color information based on a size of a pupil of a user according to an embodiment of the present invention.

Referring to FIG. 21, an HMD device 2100 may pick up an image of an eye 2120 of a user by using a camera 2110 arranged at a portion of the HMD device 2100. Although FIG. 21 shows that a lens is arranged between the camera 2110 and the user, the location of the camera 2110 may vary according to an embodiment of the present invention. The HMD device 2100 may detect the size of a pupil from the image of the eye 2120. The HMD device 2100 may obtain color information regarding the detected size of the pupil.

Figure 22:
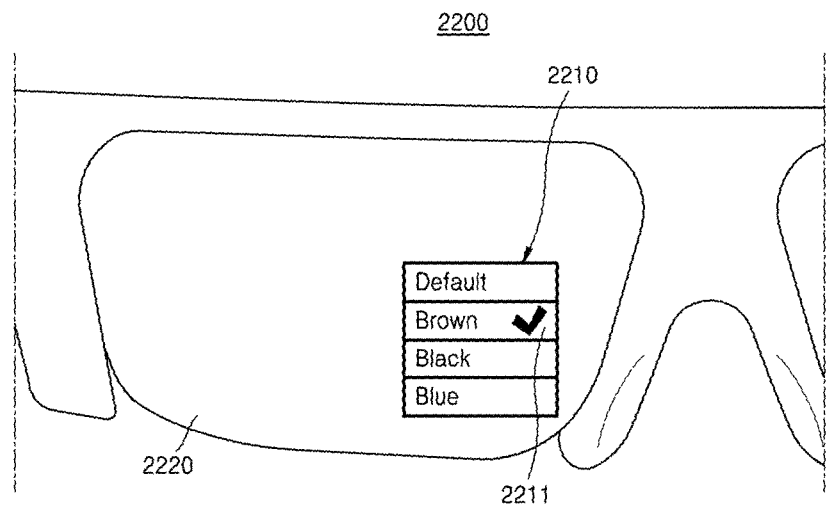
FIG. 22 is a diagram of a method of obtaining color information regarding a lens based on settings of a user according to an embodiment of the present invention.

FIG. 22 is a diagram of a method of obtaining color information regarding a lens based on settings of a user according to an embodiment of the present invention.

According to an embodiment of the present invention, a user may set color information regarding a lens 2220. Referring to FIG. 22, an HMD device 2200 may display a user interface 2210 for setting color information regarding the lens 2220. The user interface 2210 may include a list of color information, for example.

The HMD device 2200 may receive an input for selecting one from among color information regarding lens 2220 from a user via an input/output unit. For example, referring to FIG. 22, if brown 2211 is selected via the user interface 2210, the HMD device may obtain RGB values corresponding to brown as the color information regarding the lens 2220.

Figure 23:
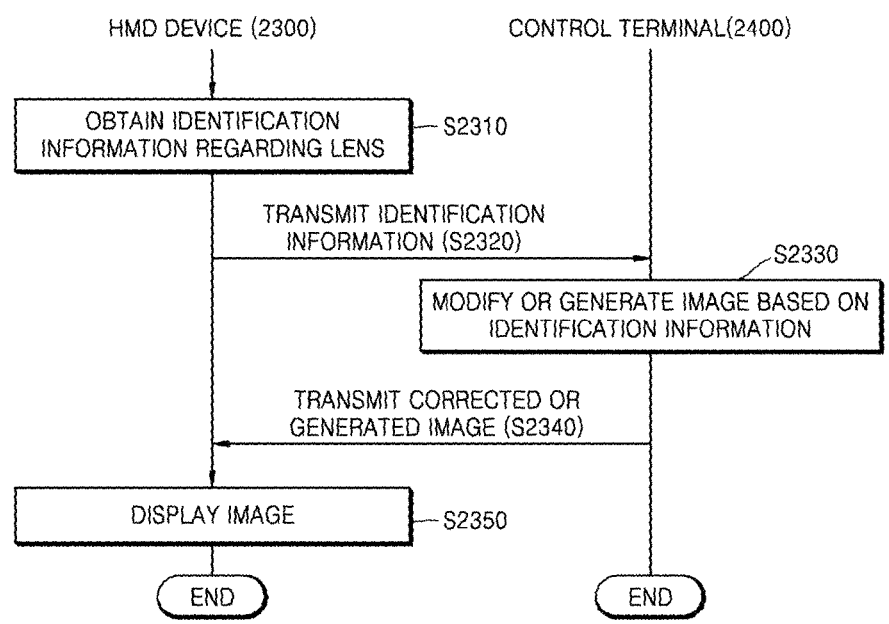
FIG. 23 is a flowchart of a method of an HMD device displaying an image according to an embodiment of the present invention.

FIG. 23 is a flowchart of a method of an HMD device to display an image according to an embodiment of the present invention. Furthermore, FIG. 24 is a diagram of a method of an HMD device to display an image according to an embodiment of the present invention.

According to an embodiment of the present invention, an HMD device may be a passive device that is unable to process an image. In this case, the HMD device may modify an image by using an active device capable of communicating with the HMD device.

Figure 24:
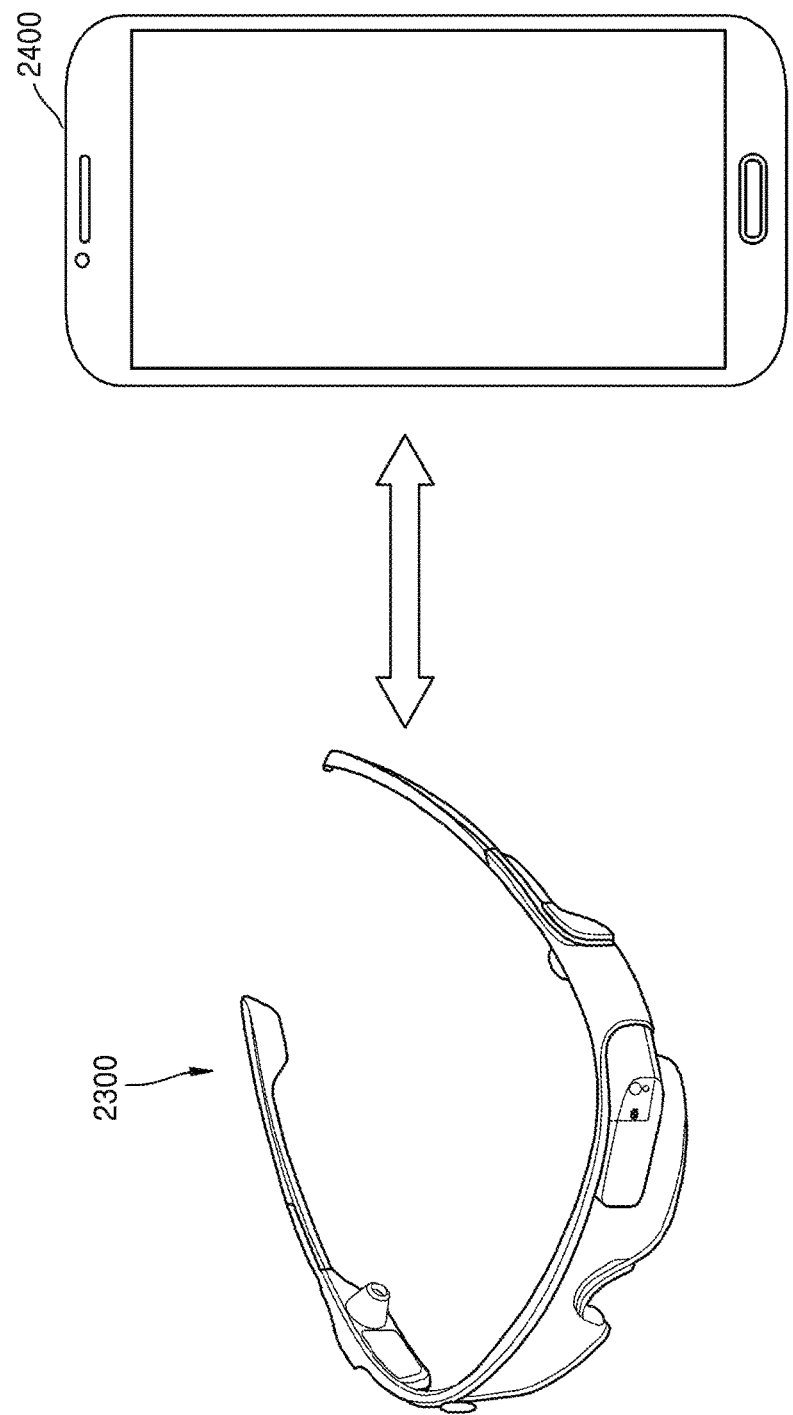
FIG. 24 is a diagram of a method of an HMD device to display an image according to an embodiment of the present invention.

Referring to FIGS. 23 and 24, an HMD device 2300 may obtain identification information regarding a lens in step S2310. Next, the HMD device 2300 may transmit the obtained identification information regarding the lens to a control terminal 2400, which is an active device, in step 2320.

Next, the control terminal 2400 may modify or generate an image to be displayed by the HMD device 2300 based on the identification information received from the HMD device 2300 in step 2330.

Next, the control terminal 2400 may transmit the modified or generated image to the HMD device 2300 in step 2340.

Next, the HMD device 2300 may display the modified or generated image in step 2350.

Figure 25:
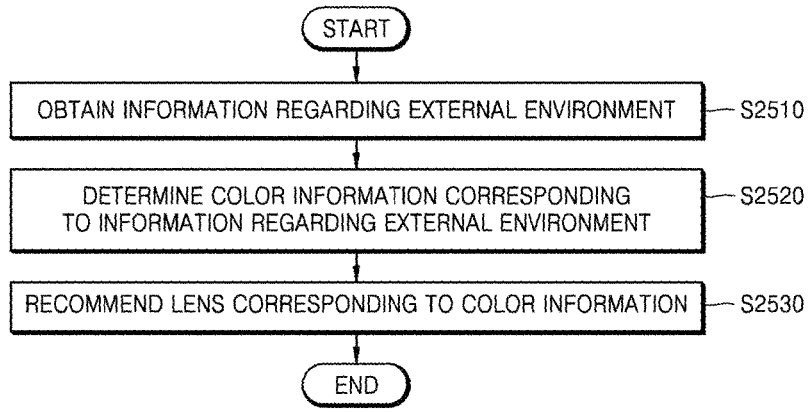
FIG. 25 is a flowchart of a method of an HMD device to recommend a lens according to an embodiment of the present invention.

FIG. 25 is a flowchart of a method of an HMD device to recommend a lens according to an embodiment of the present invention.

Referring to FIG. 25, an HMD device may obtain information regarding an external environment in step S2510. The information regarding the external environment may be information indicating conditions in the vicinity of the HMD device detected by at least one sensor. For example, information regarding the external environment may include information regarding brightness in the vicinity of the HMD device, GPS coordinates regarding location of the HMD device, or information regarding sound detected by the HMD device.

Next, the HMD device may determine color information corresponding to the information regarding the external environment obtained in step S2510 in step S2520. According to an embodiment of the present invention, the color information regarding the external environment may be raw information regarding the external environment, such as information regarding brightness in the vicinity of the HMD device. For example, the HMD device may pick up an image of the external environment of the HMD device by using the camera 560. The HMD device may obtain information regarding the external environment from the picked up image. In this case, step S2520 may be omitted. Furthermore, according to an embodiment of the present invention, color information regarding the external environment may be a color code selected from color information included in a color DataBase (DB) included internal or external to the HMD device based on information regarding brightness in the vicinity of the HMD device, GPS coordinates regarding the location of the HMD device, or information regarding sound detected by the HMD device. The HMD device may recommend a lens corresponding to the determined color information regarding the external environment in step S2530. The expression "the HMD device may recommend a lens" indicates that the HMD device displays a message instructing a user to change a lens, for example. For example, if brightness obtained in step S2510 is low, the HMD device may recommend a colorless lens. On the contrary, if brightness obtained in step S2510 is high, the HMD device may recommend a colored lens, e.g., a brown lens, a blue lens, a black lens, etc.

Figure 27:
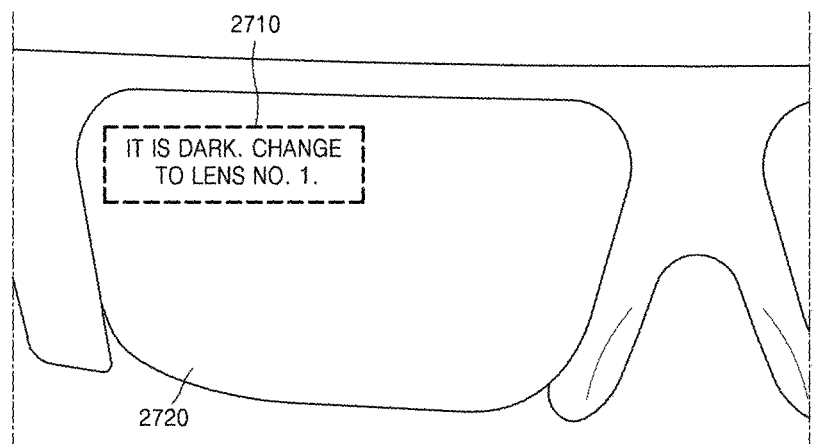
FIGS. 27 through 31 are diagrams of a method of an HMD device to recommend a lens according to an embodiment of the present invention.

FIG. 27 is a diagram of a method of an HMD device 2700 to recommend a lens.

Referring to FIG. 27, the HMD device 2700 may display a message 2710 for recommending a lens selected based on information regarding the external environment. In this case, the HMD device 2700 may display the message 2710 such that a user recognizes that the message 2710 is displayed on a lens 2720.

According to an embodiment of the present invention, if the HMD device 2700 is capable of controlling the color or transmissivity of the lens 2720, step S2530 may be replaced with a step in which the HMD device 2700 controls the color or transmissivity of the lens 2720 based on the color information regarding the external environment determined in step S2520.

Figure 26:
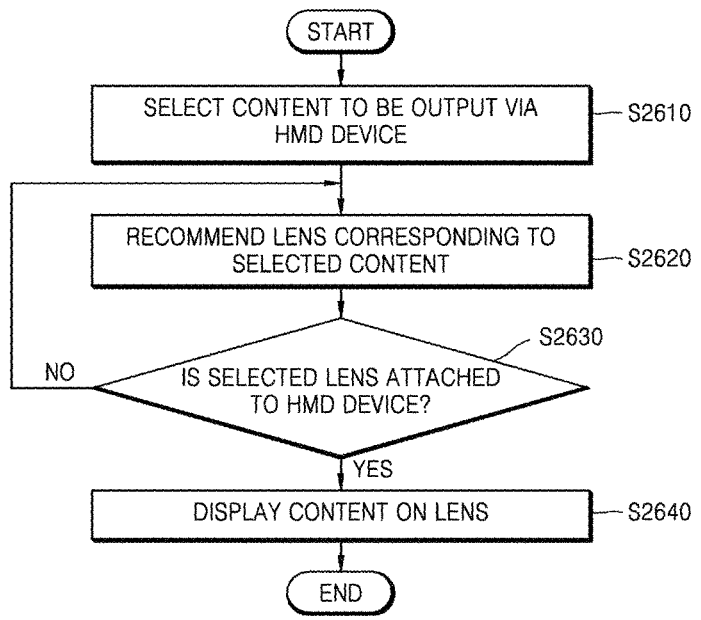
FIG. 26 is a flowchart of a method of an HMD device to recommend a lens according to an embodiment of the present invention.

FIG. 26 is a flowchart of a method of an HMD device to recommend a lens according to an embodiment of the present invention. Furthermore, FIGS. 28 through 31 are diagrams of a method of an HMD device to recommend a lens according to an embodiment of the present invention.

An HMD device may select content to be displayed via a display unit in step S2610. For example, the HMD device may display a content list and select content from the content list based on a user input received via an input/output unit of the HMD device. In this case, the content list may include executable applications or multimedia contents including pictures or moving pictures.

Figure 28:
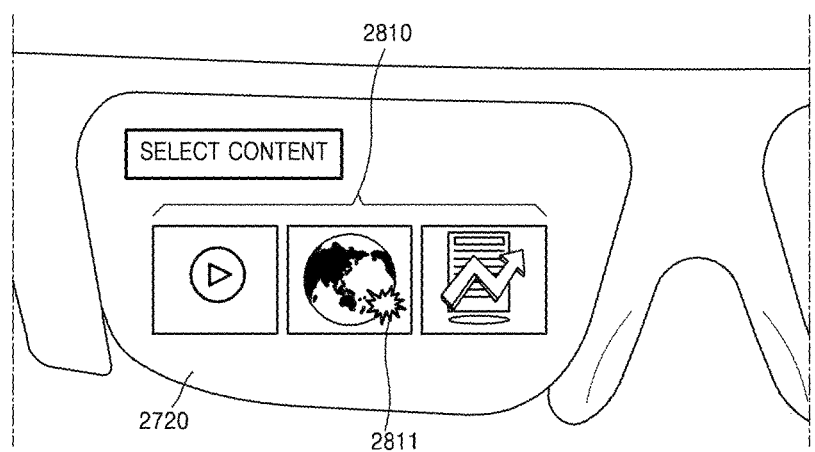
Figure 29:
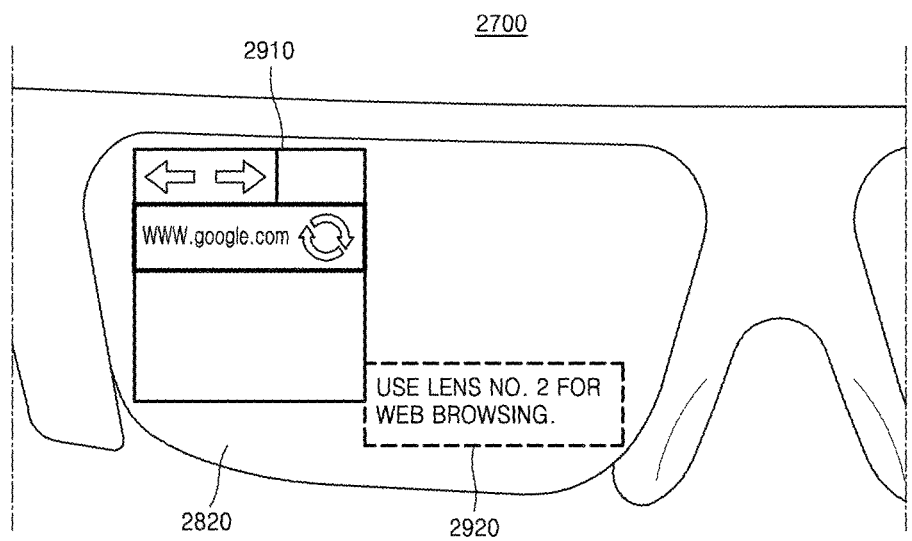

For example, referring to FIG. 28, the HMD device 2700 may display a content list 2810 on the lens 2720. The HMD device 2700 may select one from among the contents included in the content list 2810. As shown in FIG. 28, the HMD device 2700 may select a web browser 2811 from the content list 2810.

Next, the HMD device 2700 may recommend a lens corresponding to the content selected in step S2610 in step S2620 in FIG. 26. For example, referring to FIG. 29, if the web browser 2811 is selected, the HMD device 2700 may display a message 2920 for recommending a lens having a color suitable for using the web browser 2811 on a lens 2820. Furthermore, the HMD device 2700 may display a web browser executing screen image 2910.

Figure 30:
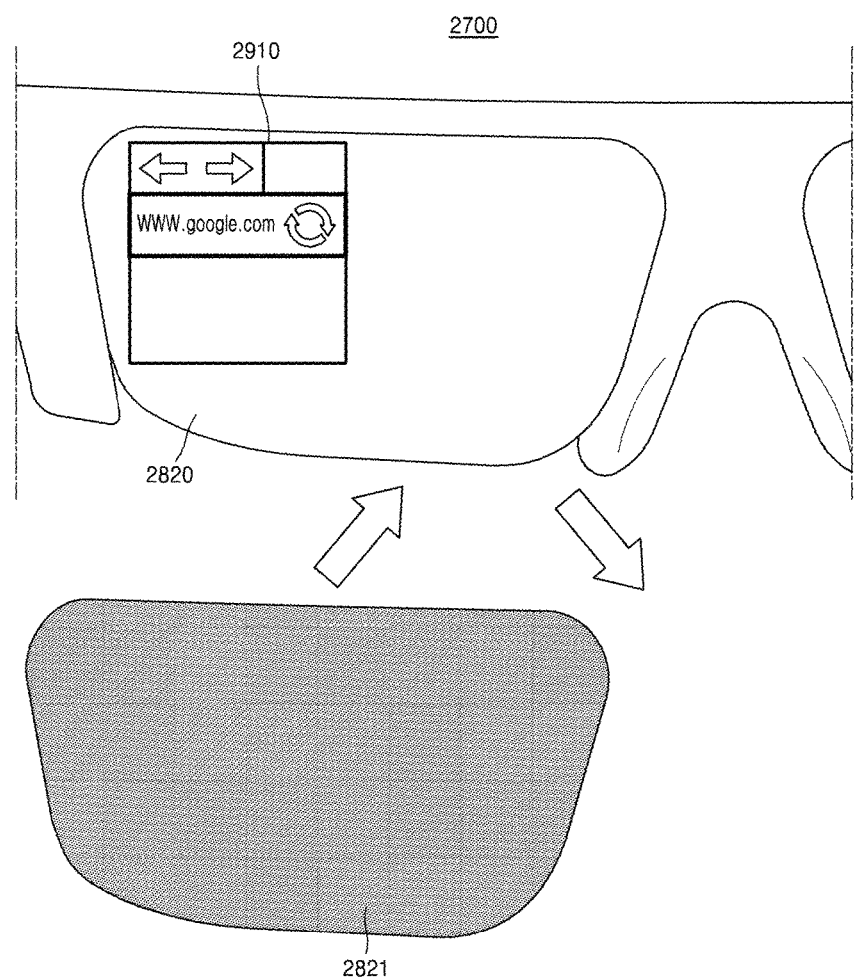

Next, it may be determined whether a recommended lens is attached to the HMD device in step S2630 of FIG. 26. In step S2630, the HMD device may determine whether a recommended lens is attached to the HMD device by using various methods. For example, the HMD device may obtain identification information regarding a lens and determine whether the obtained identification information is identical to identification information of the recommended lens. As another example, the HMD device may obtain color information regarding a lens and determine whether the obtained color information is identical to color information of the recommended lens. As shown in FIG. 30, if the lens 2820 is replaced with a lens 2821 having a different color, the HMD device may determine whether the recommended lens is attached to the HMD device. If the recommended lens is not attached to the HMD device, the HMD device may perform step S2620 of FIG. 26 again.

According to an embodiment of the present invention, if the HMD device is capable of controlling the color or transmissivity of the lens 2820, the steps S2620 and S2630 may be replaced with a step for controlling the lens 2820 to change the color or transmissivity of the lens 2820 to a color or a transmissivity recommended for displaying the selected content.

Figure 31:
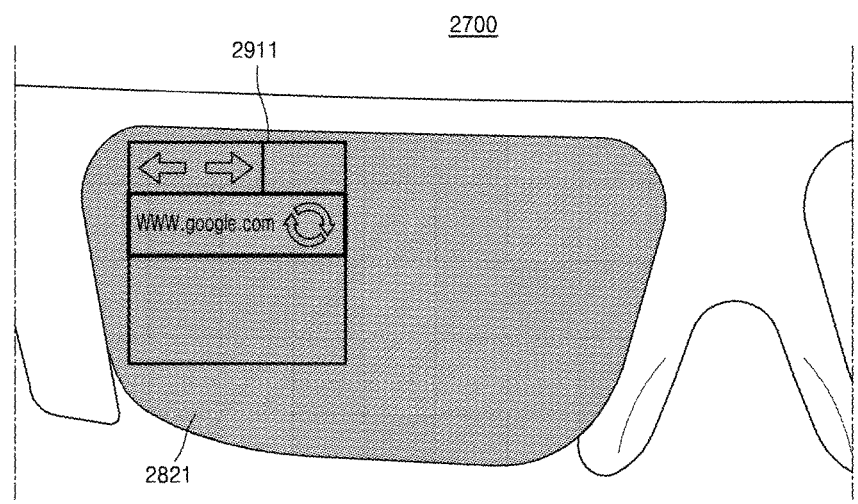

Next, the HMD device may display the selected content on a lens in step S2640. The content displayed in step S2640 may be an image modified based on color information regarding a lens modified in steps S2620 and S2630. As shown in FIG. 31, the HMD device 2700 may display a web browser for displaying a screen image 2911 with a modified color on the lens 2821 with a modified color.

Figure 32:
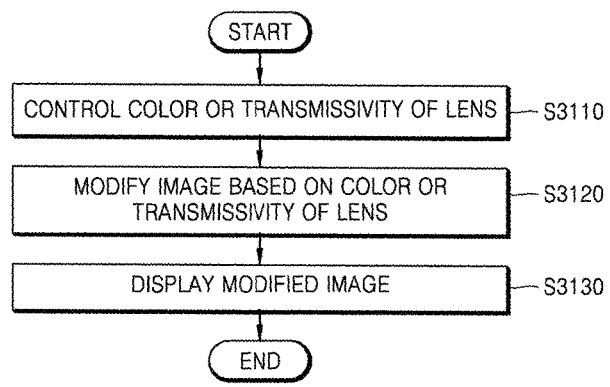
FIG. 32 is a flowchart of a method of an HMD device to change a color or transmissivity of a lens displaying an image according to an embodiment of the present invention.

FIG. 32 is a flowchart of a method of an HMD device capable of changing the color or transmissivity of a lens displaying an image according to an embodiment of the present invention.

The HMD device according to an embodiment of the present invention may control color or transmissivity of a lens in step S3110. For example, the HMD device may measure brightness by using a brightness sensor and control transmissivity of the lens. For example, the brightness sensor may include at least one of an illumination sensor for detecting ambient illumination, a photosensitive sensor for detecting color or a spectrum of light, or a combination thereof. However, the present invention is not limited thereto. As another example, the HMD device may pick up an image of surrounding environments by using a camera and measure brightness based on the picked up image. Alternatively, brightness in the vicinity of the HMD device may be measured by using information indicating the location of the HMD device. If a measured brightness is low, transmissivity of the lens may be increased. On the contrary, if the measured brightness is high, transmissivity of the lens may be reduced to protect the eyes of a user.

As a lens is formed of an electrochromic glass, a Liquid Crystal (LC) panel, or a Suspended Particle device (SPD), the HMD device may control the color or transmissivity of the lens. For example, the lens may include an electrochromic glass including an ElectroChromic material (EC) thin-film transparent electrode, an ITO glass, and an electrolyte. If the lens is formed of an electrochromic glass, the HMD device may control the color or transmissivity of the lens by controlling the magnitude of a voltage applied to the electrochromic glass.

Next, the HMD device may modify an image based on the color or transmissivity of the lens in step S3120. The HMD device may display a modified image in step S3130. For example, if the HMD device controlled a lens to change the color of the lens to blue, the HMD device may display text in red, which is the complementary color of blue.

FIG. 33 is a chart of complementary colors that may be used to modify an image according to an embodiment of the present invention.

An HMD device according to an embodiment of the present invention may modify an image by using the complementary color chart. For example, if color information obtained in step S1210 of FIG. 12 is FFFF00 (e.g. yellow), the HMD device may display text in blue, which is the complementary color of yellow. However, the present invention is not limited thereto, and methods of modifying an image may vary according to an embodiment of the present invention.

In this case, color information may vary according to an embodiment of the present invention. For example, according to an embodiment of the present invention, color information may be information instructing a color of a lens. Alternatively, according to an embodiment of the present invention, the color information may instruct a color that is recognized as a color of a background around an image displayed by an HMD device. In this case, the color of light transmitted through a lens is detected by a photosensitive sensor arranged at the HMD device, and thus the HMD device may obtain color information instructing a color recognized as a background color. According to an embodiment of the present invention, color information may be information determined based on information regarding the external environment.

Figure 34:
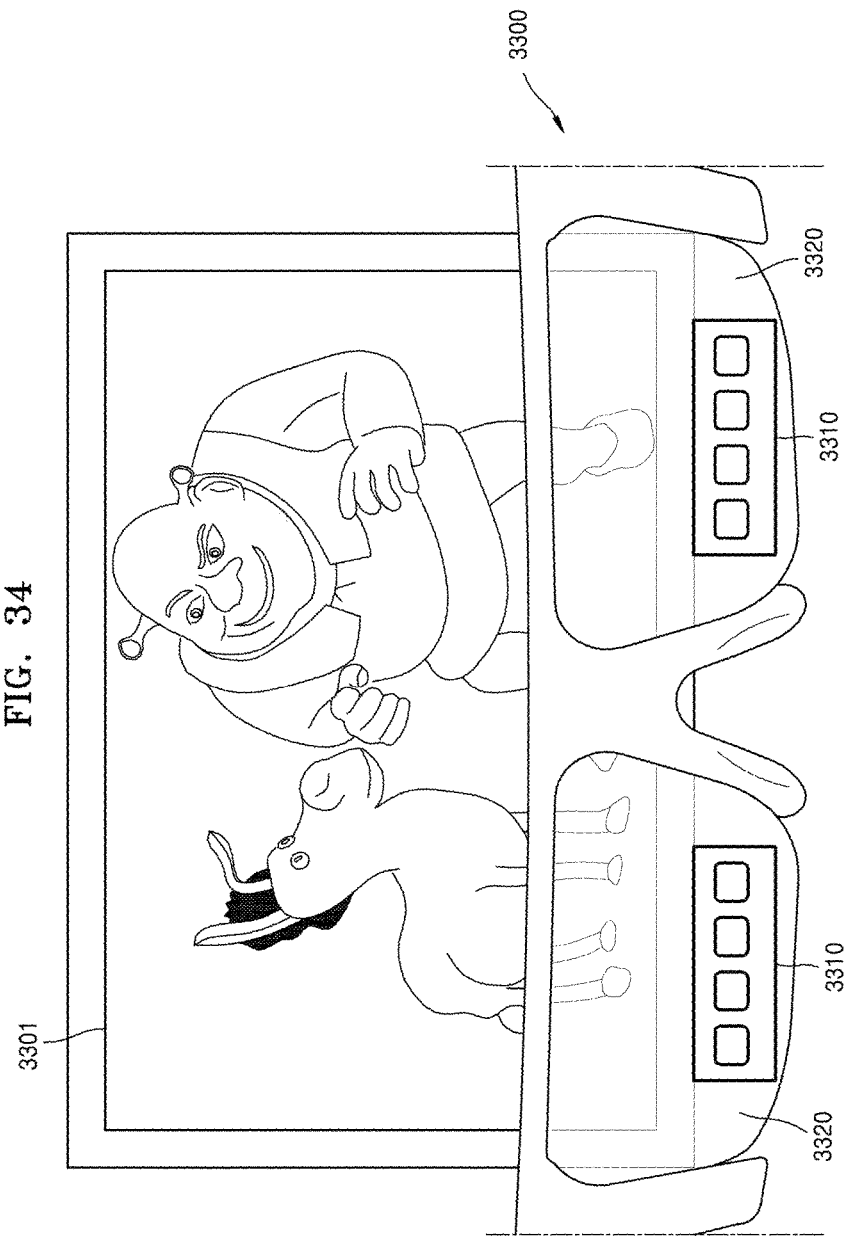
FIGS. 34 and 35 are diagrams of an HMD device displaying corrected images according to an embodiment of the present invention.
Figure 35:
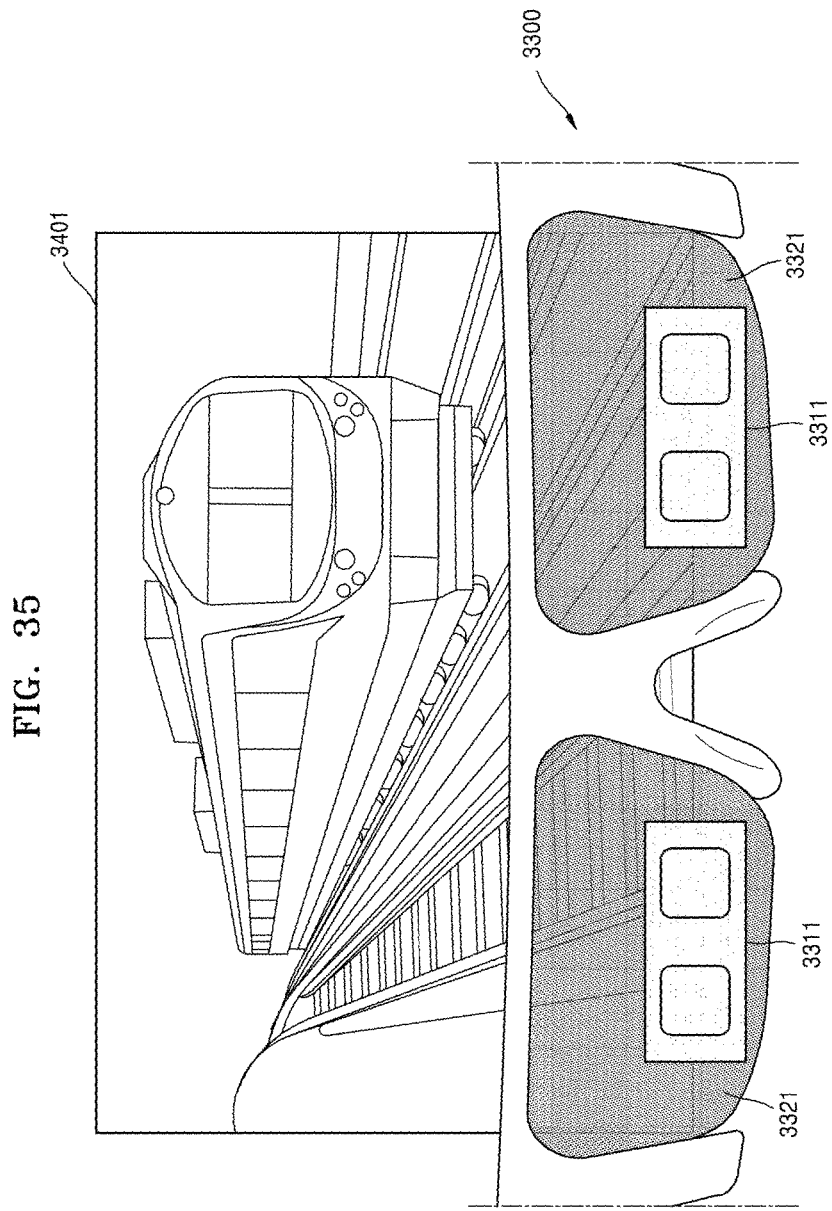

FIGS. 34 and 35 are diagrams of an HMD device displaying corrected images according to an embodiment of the present invention.

Referring to FIG. 34, an image 3310 is displayed when a user wearing an HMD device 3300 sees an indoor landscape. The HMD device 3300 may measure brightness of a circumference. If the HMD device 3300 is located at an indoor location and the measured brightness is low, the HMD device 3300 may increase a transmissivity of a lens 3320 or may control the lens 3320 to be colorless. The user of the HMD device 3300 may recognize that the image 3310 is displayed on the lens 3320.

Referring to FIG. 35, an image 3311 is displayed when the user wearing the HMD device 3300 sees an outside landscape 3401. As a measured brightness is increased, the HMD device 3300 may control the color or transmissivity of a lens 3321. When the color or transmissivity of the lens 3321 is modified, the HMD device 3300 may modify the image 3311 based on color information corresponding to the modified color or transmissivity of the lens 3321. As shown in FIG. 35, the HMD device 3300 may display the image 3311 with modified color or modified icon sizes.

Figure 36:
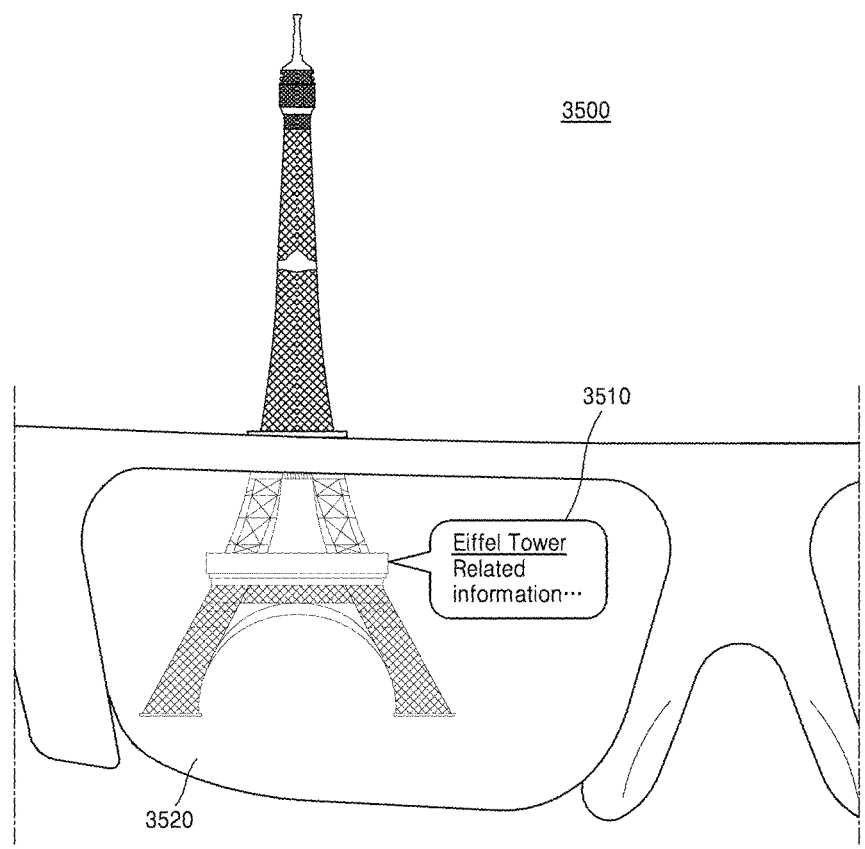
FIGS. 36 and 37 are diagrams of an HMD device displaying a modified image according to another embodiment of the present invention.
Figure 37:
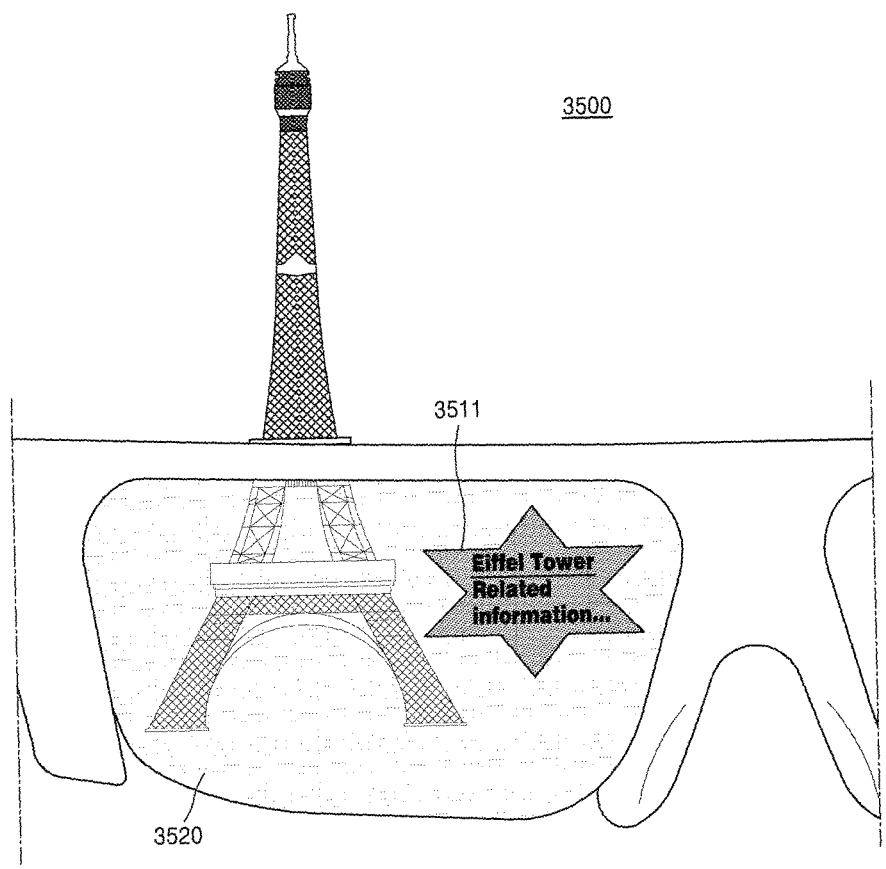

FIGS. 36 and 37 are diagrams of an HMD device displaying a modified image according to an embodiment of the present invention.

Referring to FIG. 36, an HMD device 3500 may display an image 3510 for providing an augmented reality function on a lens 3520. The image 3510 for providing augmented reality function may include information regarding an actual object a user is seeing, for example. As shown in FIG. 37, if the color or transmissivity of the lens 3520 is modified, the HMD device 3500 may display a modified image 3511. The modified image 3511 may not only be an image with a modified color, but also an image including modified objects as shown in FIG. 37.

Figure 38:
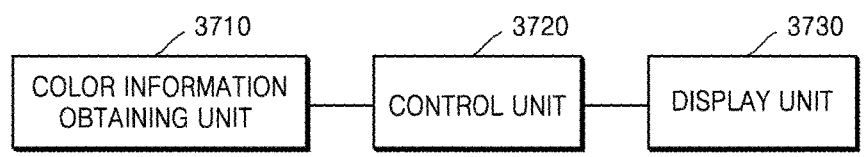
FIG. 38 is a block diagram of an HMD device according to an embodiment of the present invention.

FIG. 38 is a block diagram of an HMD device according to an embodiment of the present invention.

The HMD device may include a color information obtaining unit 3710, a control unit 3720, and a display unit 3730.

The color information obtaining unit 3710 according to an embodiment of the present invention may obtain color information regarding a lens. The color information obtaining unit 3710 may be configured in various ways according to an embodiment of the present invention. For example, as shown in FIG. 15, the color information obtaining unit 3710 may include the electrode 1532. Alternatively, the color information obtaining unit 3710 may include a recognizing unit, which recognizes a code by using the camera 1710, as shown in FIG. 17, or may obtain color information regarding a lens by using the photosensitive sensor 1930, as shown in FIG. 19. Alternatively, if the control unit 3720 of FIG. 38 controls the color or transmissivity of a lens, the color information obtaining unit 3710 may be included in the control unit 3720.

Furthermore, if a lens may be attached to and detached from the HMD device, the color information obtaining unit 3710 may determine whether the lens is attached to the HMD device. When a lens attached to the HMD device is recognized, the color information obtaining unit 3710 may obtain color information regarding the attached lens.

The control unit 3720 may process information and control components of the HMD device. The control unit 3720 may modify an image based on color information obtained by the color information obtaining unit 3710. The control unit 3720 may control the display unit 3730 to display the modified image.

According to an embodiment of the present invention, the control unit 3720 may control at least one of the color and transmissivity of a lens. In this case, the lens may include an electrochromic glass, an SPD, or an LC. For example, the lens may include a glass having the structure as shown in FIG. 10. If the control unit 3720 of FIG. 38 controls the color or transmissivity of a lens, the control unit 3720 may obtain color information regarding the lens corresponding to the modified color or transmissivity. Furthermore, the control unit 3720 may modify an image based on the obtained color information regarding the lens.

According to an embodiment of the present invention, the control unit 3720 may select content that may be output via the display unit 3730. For example, the HMD device may display a content list and select content from the content list based on a user input received via an input/output unit of the HMD device. In this case, the content list may include executable applications or multimedia contents including pictures or moving pictures.

Furthermore, an HMD device according to an embodiment of the present invention may further include a brightness sensor for obtaining information regarding external brightness. The control unit 3720 may modify an image in further consideration of information regarding external brightness obtained via the brightness sensor. For example, the control unit 3720 may increase brightness of an image as external brightness increases.

An HMD device according to an embodiment of the present invention may modify an image in further consideration of colors of a background a user is seeing (e.g. a background of the image).

Figure 39:
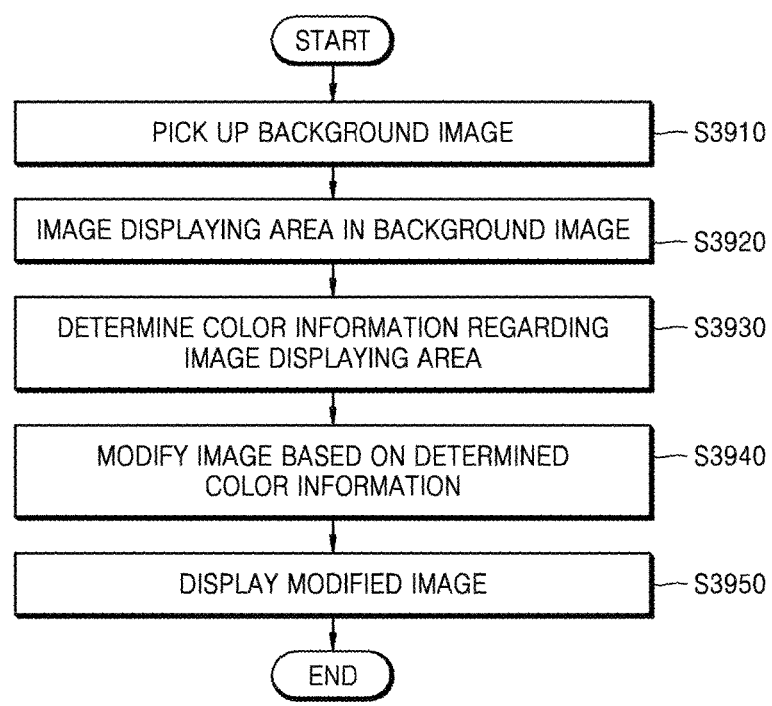
FIG. 39 is a flowchart of a method of an HMD device displaying an image according to an embodiment of the present invention.

FIG. 39 is a flowchart of an HMD device 4000 displaying an image according to an embodiment of the present invention. Furthermore, FIGS. 40 through 43 are diagrams of the HMD device 4000 displaying a corrected image 4125 according to an embodiment of the present invention.

First, the HMD device 4000 may pick up a background image 4020 in step S3910. The HMD device 4000 may include a camera 4010 for picking up an image in a viewing direction of a user 1. The HMD device 4000 may pick up the background image 4020 by using the camera 4010.

Figure 40:
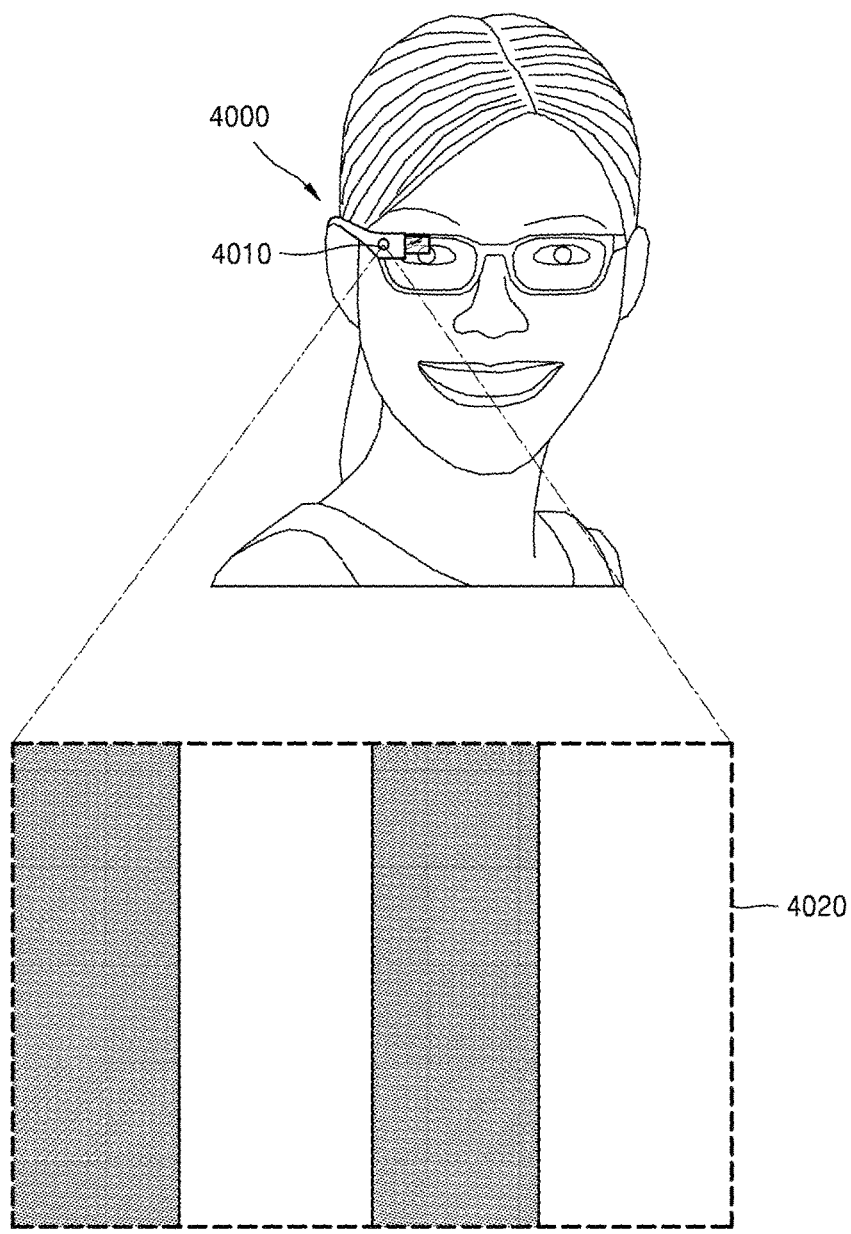
FIGS. 40 through 43 are diagrams of an HMD device displaying a corrected image according to another embodiment of the present invention.

Referring to FIG. 40, the HMD device 4000 may include the camera 4010 at a portion of the HMD device 4000. If the user 1 wearing the HMD device 4000 is seeing a crosswalk, the camera 4010 may obtain the background image 4020 in which the crosswalk is captured.

Next, the HMD device 4000 may determine an image displaying area 4120 related to a location of an image 4110 to be displayed by the HMD device 4000 in the background image 4020 in step S3920. When the HMD device 4000 displays the image 4110, the image displaying area 4120 may be a portion of the background image 4020, the portion recognized by a user as a region having displayed therein the image 4110. According to an embodiment of the present invention, the image displaying area 4120 may be determined based on a location where the image 4110 is displayed.

Figure 41:
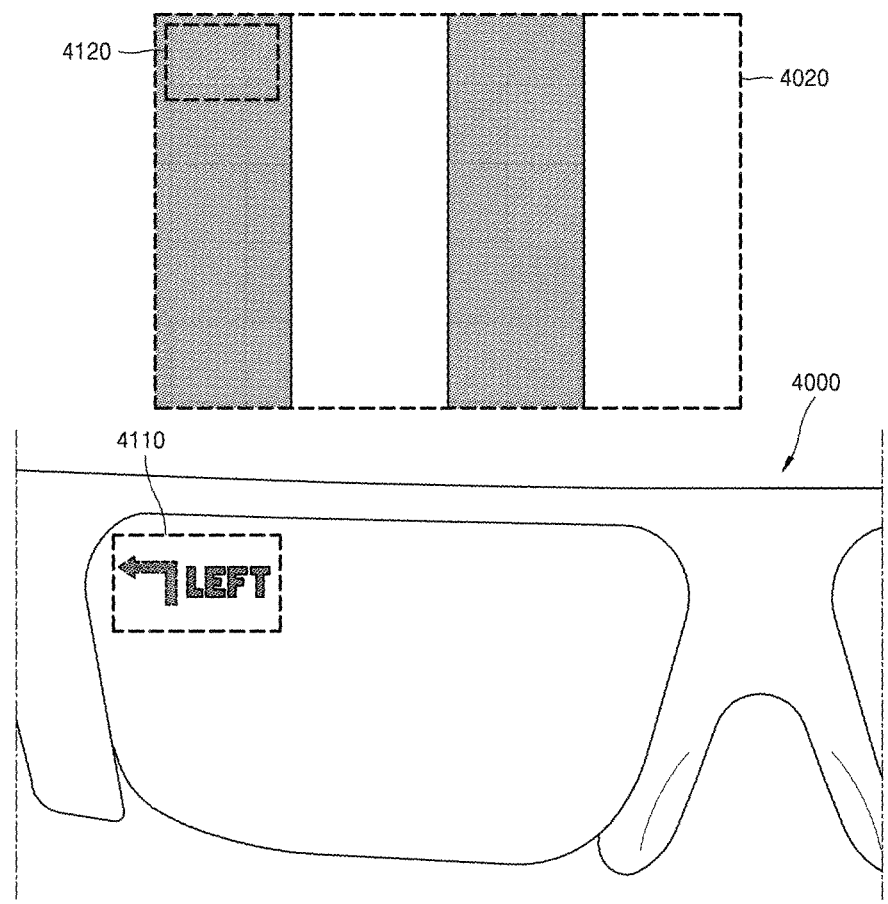
Figure 42:
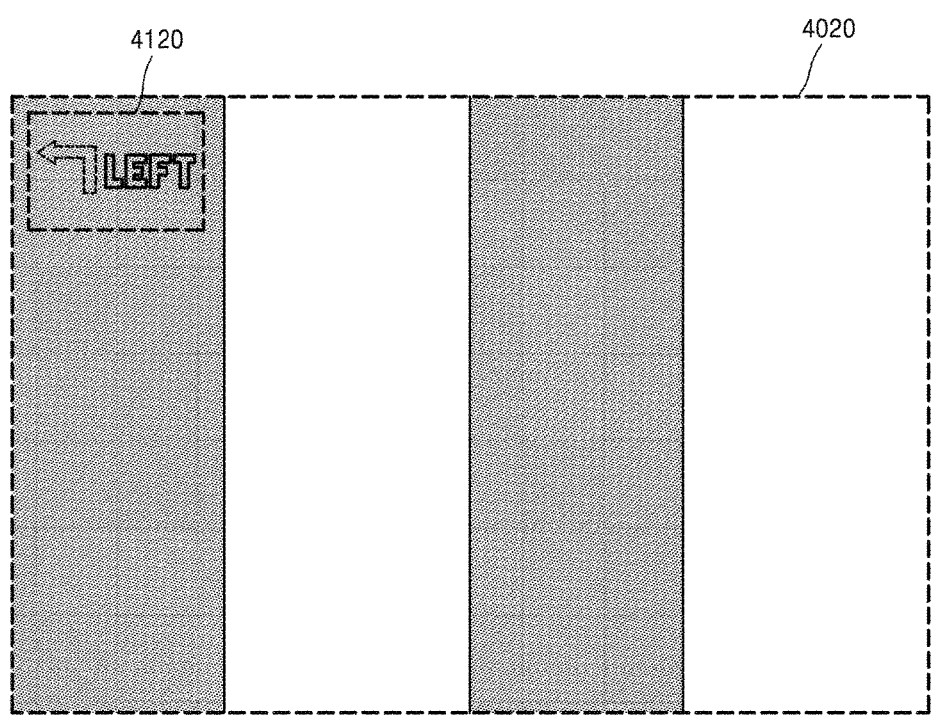

Referring to FIG. 41, if the image 4110 is displayed at the upper-left portion of the HMD device 4000, the HMD device 4000 may determine that the image displaying area 4120 is located at the upper-left portion of the background image 4020. Referring to FIG. 42, the user 1 may recognize that the image 4110 is displayed on the image displaying area 4120 in the background image 4020. In this case, if the colors of the background in the image displaying area 4120 are similar to colors of the image 4110, it may be difficult for the user 1 to recognize the image 4110. Therefore, it is necessary to modify colors of the image 4110.

When the image displaying area 4120 is determined in step S3920 in FIG. 39, the HMD device 4000 may determine color information regarding the image displaying area 4120 in step S3930. In this case, step S3930 may vary according to the embodiment of the present invention. For example, the HMD device 4000 may determine an average color of pixels included in the image displaying area 4120 as color information regarding the image displaying area 4120. As another example, the HMD device 4000 may extract color information from a feature point, such as a center point, in the image displaying area 4120.

Furthermore, according to an embodiment of the present invention, the HMD device 4000 may determine color information in consideration of both the color of a lens and the color of the image displaying area 4120. If the user 1 sees an object through a lens, the user 1 may recognize the object in a color different from an actual color of the object. Therefore, in step S3930, the HMD device 4000 may determine the color of an object recognized by the user 1 through the lens as color information regarding the image displaying area 4120.

Next, the HMD device 4000 may modify an image based on color information regarding the image displaying area 4120 determined in step S3930 in step S3940. The HMD device 4000 may display the modified image via a display unit in step S3950.

Figure 43:
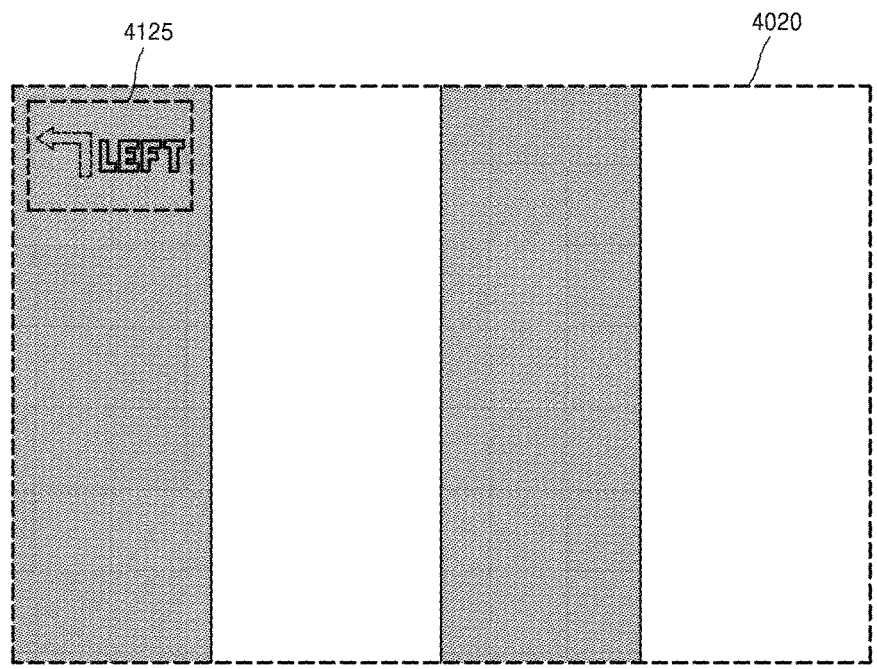

For example, the HMD device 4000 may determine a complementary color with respect to color information regarding the image displaying area 4120 and modify the color of the image 4110 to the determined complementary color. Referring to FIG. 43, the HMD device 4000 may display a modified image 4125, such that the modified image 4125 is easily distinguished from the background image 4020.

In step S3940, it is not necessary to modify an entire image. For example, only a color of the borders of an image may be modified or a separate background may be added around an image.

Figure 44:
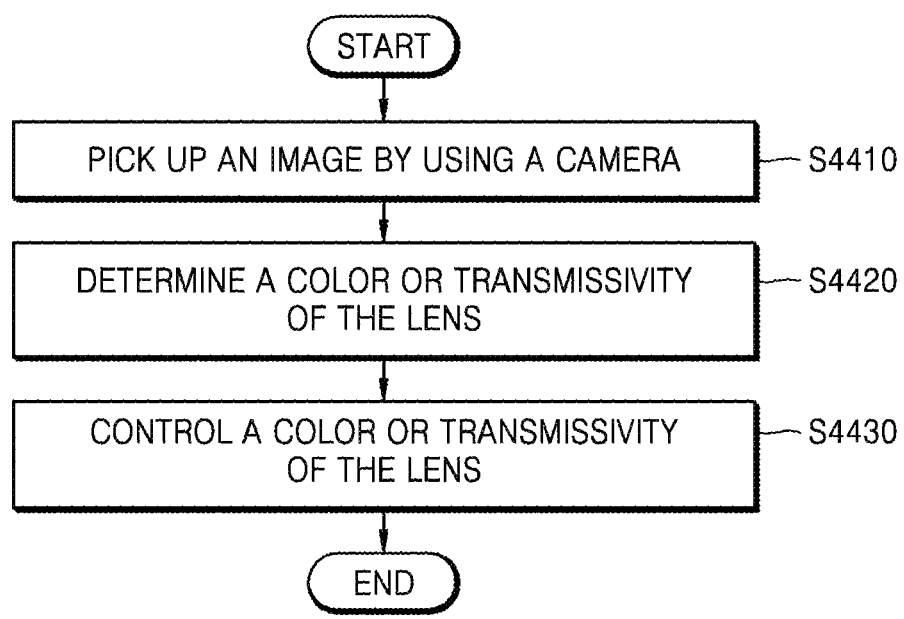
FIG. 44 is a flowchart of a method of an HMD device controlling a color or transmissivity of a lens according to an embodiment of the present invention.

FIG. 44 is a flowchart of a method of an HMD device controlling a color or transmissivity of a lens according to an embodiment of the present invention.

First, in step S4410, the HMD device may pick up an image by using a camera included in the HMD device. In this case, the camera may be aimed externally from the HMD device. In other words, the camera may pick up an image by receiving light that is not transmitted through a lens.

Next, in step S4420, the HMD device may determine a color or transmissivity of the lens. In this case, the lens may include a smart window of which transmissivity or color may be modified under the control of a control unit of the HMD device. For example, the HMD device may determine external brightness based on the picked up image. In other words, the HMD device may analyze brightness of the picked up image and determine brightness external to the HMD device based on a result of the analysis. If external brightness is high, the HMD device may change a color of the lens to a dark color, such as brown. On the contrary, if external brightness is low, the HMD device may control the lens to be colorless or determine a color or transmissivity of the lens for the lens to have a high transmissivity.

Next, in step S4430, the HMD device may control a color or transmissivity of the lens, such that the lens has the color or the transmissivity determined in step S4420.

FIG. 45 is a diagram of a method of an HMD device picking up an image for controlling a color or transmissivity according to an embodiment of the present invention.

According to an embodiment of the present invention, the HMD device may include a plurality of cameras. Referring to FIG. 45, the HMD device may include a first camera 560-1 and a second camera 560-2. The first camera 560-1 may be arranged to receive light 4520 transmitted externally to the HMD device but not through the lens 580. The second camera 560-2 may be arranged to receive light 4510 transmitted through the lens 580.

The HMD device may determine a color or transmissivity of the lens 580 based on the light 4520 received via the first camera 560-1 and the light 4510 received via the second camera 560-2. For example, the HMD device may compare the light 4520 received via the first camera 560-1 to the light 4510 received via the second camera 560-2 (e.g., a brightness difference or a color difference) and determine a color or transmissivity of the lens 580 based on a result of the comparison. Alternatively, the HMD device may select one of the light 4520 received via the first camera 560-1 and the light 4510 received via the second camera 560-2 and determine a color or transmissivity of the lens 580 based on the brightness or the color of the selected light. According to an embodiment of the present invention, methods of determining a color or transmissivity of a lens may vary.

Figure 46:
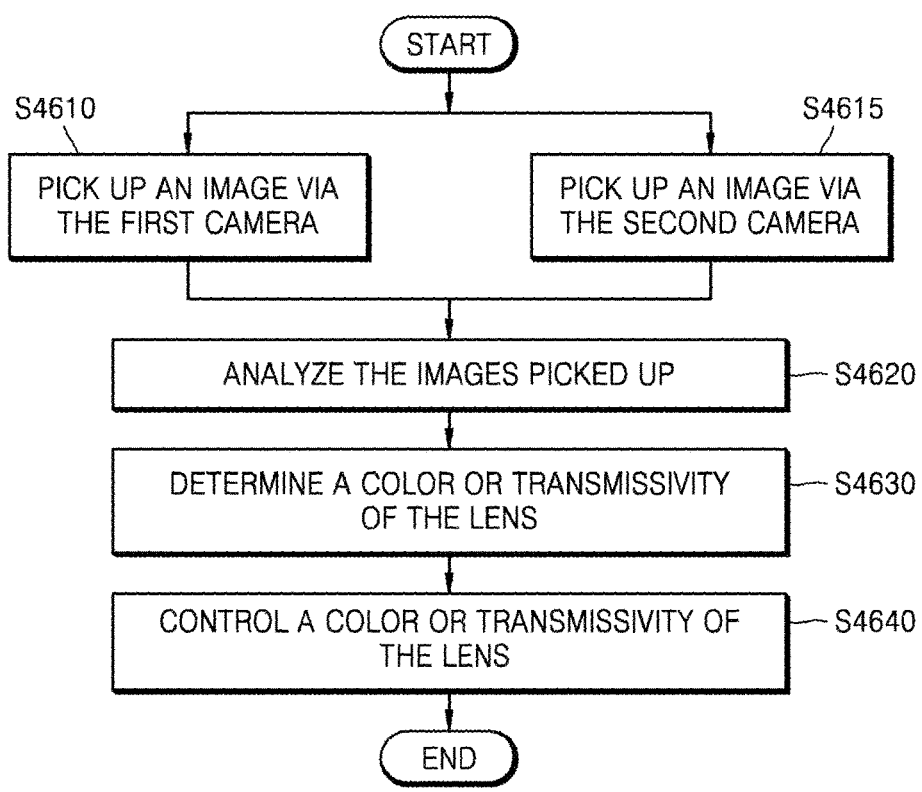
FIG. 46 is a flowchart of a method of an HMD device controlling a color or transmissivity of a lens according to an embodiment of the present invention.

FIG. 46 is a flowchart of a method of an HMD device controlling a color or transmissivity of a lens according to an embodiment of the present invention.

First, the HMD device may pick up an image via the first camera 560-1 in step S4610. Furthermore, the HMD device may pick up an image via the second camera 560-2 in step S4615.

Next, in step S4620, the HMD device may analyze the images picked up in steps S4610 and S4615. For example, the HMD device may compare the image picked up via the first camera 560-1 to the image picked up via the second camera 560-2. Alternatively, the HMD device may select one of the images picked up via the first camera 560-1 and the second camera 560-2. However, the present invention is not limited thereto.

Next, in step S4630, the HMD device may determine a color or transmissivity of the lens. When a color or transmissivity of the lens is determined, the HMD device may control a color or transmissivity of the lens based on the determined color or transmissivity in step S4640.

As described above, according to an embodiment of the present invention, a user may easily recognize contents or user interfaces.

An embodiment of the present invention may also be implemented as a non-transitory computer readable recording medium comprising instructions, such a program module, executable by a computer. Non-transitory computer readable recording media can be any available media that can be accessed by a computer and include both volatile media (e.g., Random Access Memory (RAM)) and nonvolatile media (e.g., Read Only Memory (ROM)) and both removable and non-removable media. Furthermore, the non-transitory computer readable recording media may include both computer storage media and communication media. Computer storage media include computer readable instructions, data structures, program modules, or volatile, non-volatile, removable, and non-removable media embodied by using any technique for storing information. Communication media typically include computer readable instructions, data structures, program modules, other data or other transport mechanisms for modulated data signals, and any information delivery media. For example, the non-transitory computer readable recording media may be ROM, RAM, flash memory, a Compact Disc (CD), a Digital Video Disc (DVD), a magnetic disk, or a magnetic tape.

It should be understood that the embodiments of the present invention described herein should be considered in a descriptive sense only and not for purposes of limitation. Descriptions of features or aspects within each embodiment of the present invention should typically be considered as available for other similar features or aspects in other embodiments.

While one or more embodiments of the present invention have been described with reference to the figures, it will be understood by those of ordinary skill in the art that various changes in form and details may be made therein without departing from the spirit and scope of the present invention as defined by the appended claims and their equivalents.

What is claimed is:

1. A head mounted display (HMD) device, comprising:
a color information obtaining unit configured to obtain color information regarding a detachable lens arranged at a portion of the HMD device, wherein the color information includes information regarding an original color of the detachable lens; and a control unit configured to output an image modified based on the color information via a display unit arranged at the HMD device;

wherein when the detachable lens is attached to the HMD device, the color information obtaining unit obtains identification information of the detachable lens and obtains the color information of the detachable lens based on the identification information of the detachable lens, and wherein the control unit is further configured to select content to be output via the display unit, and determine a recommended lens corresponding to the selected content.

2. The HMD device of claim 1, wherein the detachable lens is configured to modify at least one of color or transmissivity thereof under the control of the control unit, and the color information obtaining unit is further configured to obtain color information corresponding to the modified color or transmissivity of the detachable lens.

3. The HMD device of claim 1, wherein the detachable lens is attachable to and detachable from the HMD device, and wherein the control unit is further configured to obtain the color information of the detachable lens, if it is detected that the detachable lens is attached to the HMD device.

4. The HMD device of claim 3, wherein the color information obtaining unit further comprises a recognizing unit configured to recognize a code on the detachable lens and to obtain color information corresponding to the code recognized by the recognizing unit.

5. The HMD device of claim 3, wherein the control unit is further configured to output a recommendation message for recommending the determined lens via the display unit.

6. A head mounted display (HMD) device, comprising:
a color information obtaining unit configured to obtain color information regarding a detachable lens arranged at a portion of the HMD device, wherein the color information includes information regarding an original color of the detachable lens; and
a control unit configured to output an image modified based on the color information via a display unit arranged at the HMD device;
a brightness sensor configured to obtain information regarding external brightness,
wherein when the detachable lens is attached to the HMD device, the color information obtaining unit obtains identification information of the detachable lens and obtains the color information of the detachable lens based on the identification information of the detachable lens, and
wherein the control unit is further configured to determine a recommended lens corresponding to the information regarding the external brightness obtained via the brightness sensor.

7. The HMD device of claim 1, wherein the color information obtaining unit comprises a photosensitive sensor and is further configured to obtain the color information regarding the detachable lens based on information obtained via the photosensitive sensor.

8. The HMD device of claim 1, further comprising a brightness sensor configured to obtain information regarding external brightness,
wherein an image output via the display unit is an image modified in further consideration of the information regarding the external brightness.

9. A method of displaying an image by a head mounted display (HMD) device, the method comprising:
obtaining color information regarding a detachable lens arranged at a portion of the HMD device, wherein the color information includes information regarding an original color of the detachable lens;
outputting an image modified based on the color information via a display unit arranged at the HMD device;
selecting content to be output via the display unit; and
recommending, by a control unit, a lens corresponding to the selected content;
wherein when the detachable lens is attached to the HMD device, obtaining identification information of the detachable lens and obtaining the color information of the detachable lens based on the identification information of the detachable lens.

10. The method of claim 9, further comprising modifying at least one of a color or transmissivity of the detachable lens under control of a control unit,
wherein, in obtaining the color information, color information corresponding to a modified color or transmissivity of the detachable lens is obtained.

11. The method of claim 9, wherein the detachable lens is attachable to and detachable from the HMD device, and
when it is recognized that the detachable lens is attached to the HMD device, the color information is obtained.

12. The method of claim 11, wherein obtaining the color information comprises:
recognizing a code on the detachable lens; and
obtaining color information corresponding to the code.

13. The method of claim 11,
wherein, in displaying the modified image, an image including the selected content modified based on color information regarding the recommended lens is output.

14. The method of claim 11, further comprising:
obtaining information regarding external brightness; and
recommending a lens corresponding to the information regarding the external brightness.

15. The method of claim 9, wherein the HMD device comprises a photosensitive sensor, and,
in obtaining the color information, the color information is obtained based on information obtained via the photosensitive sensor.

16. The method of claim 9, further comprising obtaining information regarding external brightness,
wherein an image output via the display unit is an image modified in further consideration of the information regarding the external brightness.

17. A non-transitory computer readable recording medium having recorded thereon a computer program for implementing a method by a head mounted display (HMD) device of displaying an image, the method comprising:
obtaining color information regarding a detachable lens arranged at a portion of the HMD device, wherein the color information includes information regarding an original color of the detachable lens;
outputting an image modified based on the color information via a display unit arranged at the HMD device;
selecting content to be output via the display unit; and
recommending a lens corresponding to the selected content;
wherein when the detachable lens is attached to the HMD device, obtaining identification information of the detachable lens and obtaining the color information of the detachable lens based on the identification information of the detachable lens.

18. A chipset for displaying an image, the chipset configured to:

obtain color information regarding a detachable lens arranged at a portion of a head mounted display (HMD) device, wherein the color information includes information regarding an original color of the detachable lens;

output an image modified based on the color information via a display unit arranged at the HMD device;

selecting content to be output via the display unit; and recommending a lens corresponding to the selected content;

wherein when the detachable lens is attached to the HMD device, obtain identification information of the detachable lens and obtain the color information of the detachable lens based on the identification information of the detachable lens.

\* \* \* \* \*